US006035305A

United States Patent [19]
Strevey et al.

[11] Patent Number: 6,035,305
[45] Date of Patent: Mar. 7, 2000

[54] COMPUTER-BASED METHOD OF STRUCTURING PRODUCT CONFIGURATION INFORMATION AND CONFIGURING A PRODUCT

[75] Inventors: Thomas Scott Strevey, Everett; Kelly John Kegley, Renton, both of Wash.

[73] Assignee: The Boeing Company, Seattle, Wash.

[21] Appl. No.: 08/924,716

[22] Filed: Aug. 29, 1997

[51] Int. Cl.[7] .................................................. G06F 17/00
[52] U.S. Cl. .......................... 707/104; 345/420; 345/425; 345/429; 345/441
[58] Field of Search .................................. 364/468, 489; 706/59; 345/333, 420, 433, 439, 427, 326, 357; 395/683; 707/104, 502, 500.27

[56] References Cited

U.S. PATENT DOCUMENTS

| | | | |
|---|---|---|---|
| 4,816,994 | 3/1989 | Freiling et al. | 706/59 |
| 4,885,717 | 12/1989 | Beck et al. | 395/704 |
| 5,133,045 | 7/1992 | Gaither et al. | 706/46 |
| 5,197,120 | 3/1993 | Saxton et al. | 345/439 |
| 5,268,997 | 12/1993 | Funaki | 345/427 |
| 5,278,946 | 1/1994 | Shimada et al. | 706/53 |
| 5,321,829 | 6/1994 | Zifferer | 395/183.22 |
| 5,353,390 | 10/1994 | Harrington | 345/420 |
| 5,357,439 | 10/1994 | Matsuzaki et al. | 364/468 |
| 5,388,264 | 2/1995 | Tobias, II et al. | 707/104 |
| 5,437,008 | 7/1995 | Gay et al. | 707/502 |
| 5,444,837 | 8/1995 | Bomans et al. | 345/440 |
| 5,455,599 | 10/1995 | Cabral et al. | 345/133 |
| 5,487,135 | 1/1996 | Freeman | 706/59 |
| 5,544,067 | 8/1996 | Rostoker et al. | 364/489 |
| 5,544,302 | 8/1996 | Nguyen | 345/326 |
| 5,564,007 | 10/1996 | Kazen-Goudarzi et al. | 345/326 |
| 5,581,672 | 12/1996 | Letcher, Jr. | 345/420 |
| 5,634,057 | 5/1997 | Dickinson | 395/683 |
| 5,710,896 | 1/1998 | Seidl | 345/333 |
| 5,720,018 | 2/1998 | Muller et al. | 345/433 |
| 5,731,814 | 3/1998 | Bala | 345/356 |
| 5,737,507 | 4/1998 | Smith | 345/433 |
| 5,870,771 | 2/1999 | Oberg | 707/502 |
| 5,877,766 | 3/1999 | Bates et al. | 345/357 |
| 5,892,691 | 4/1999 | Fowler | 707/500.27 |

OTHER PUBLICATIONS

*Programming Visio*, Shapeware Corporation, Seattle, WA, 1994. Chaps. 1, 2, 4, 7, 8, 9, and Appendix A.

*Primary Examiner*—Wayne Amsbury
*Assistant Examiner*—Thuy Pardo
*Attorney, Agent, or Firm*—Christensen O'Connor Johnson & Kindness PLLC

[57] ABSTRACT

A computer based method of collecting, structuring, and displaying product configuration information, and using the product configuration information to produce a computer program that validates product option selections and configures a product, is disclosed. The computer based method is used to create a Knowledge Map that contains product information objects. A product information object can be one of: a product option object, representing a customer option; a product module object, representing a collection of product parts, plans, tools, functional tests, inspections, or software; a grouping object, grouping product options or modules; or a relational object representing a relation between product objects. An input device is used to select a plurality of product information objects and position the objects in a display area. Upon selection of the objects, an operator is prompted to input specific information pertaining to the selected object. Constraints limit the selections that an operator can make, the appearance of the objects, and the configurations that can be produced from selected objects. Information pertaining to selected objects and their configuration is stored in a database. Changes can be made directly to the information stored in the database, and these changes are reflected in a corresponding display of the product information. After producing a Knowledge Map, the information is retrieved from a database to produce a set of rules that is input to a rule-based program for validating a set of product option selections and configuring a final product defined by resulting modules. The information can also be retrieved to produce object-based information to be used in the creation of an object-based program for validating a set of product options and configuring a product.

21 Claims, 28 Drawing Sheets

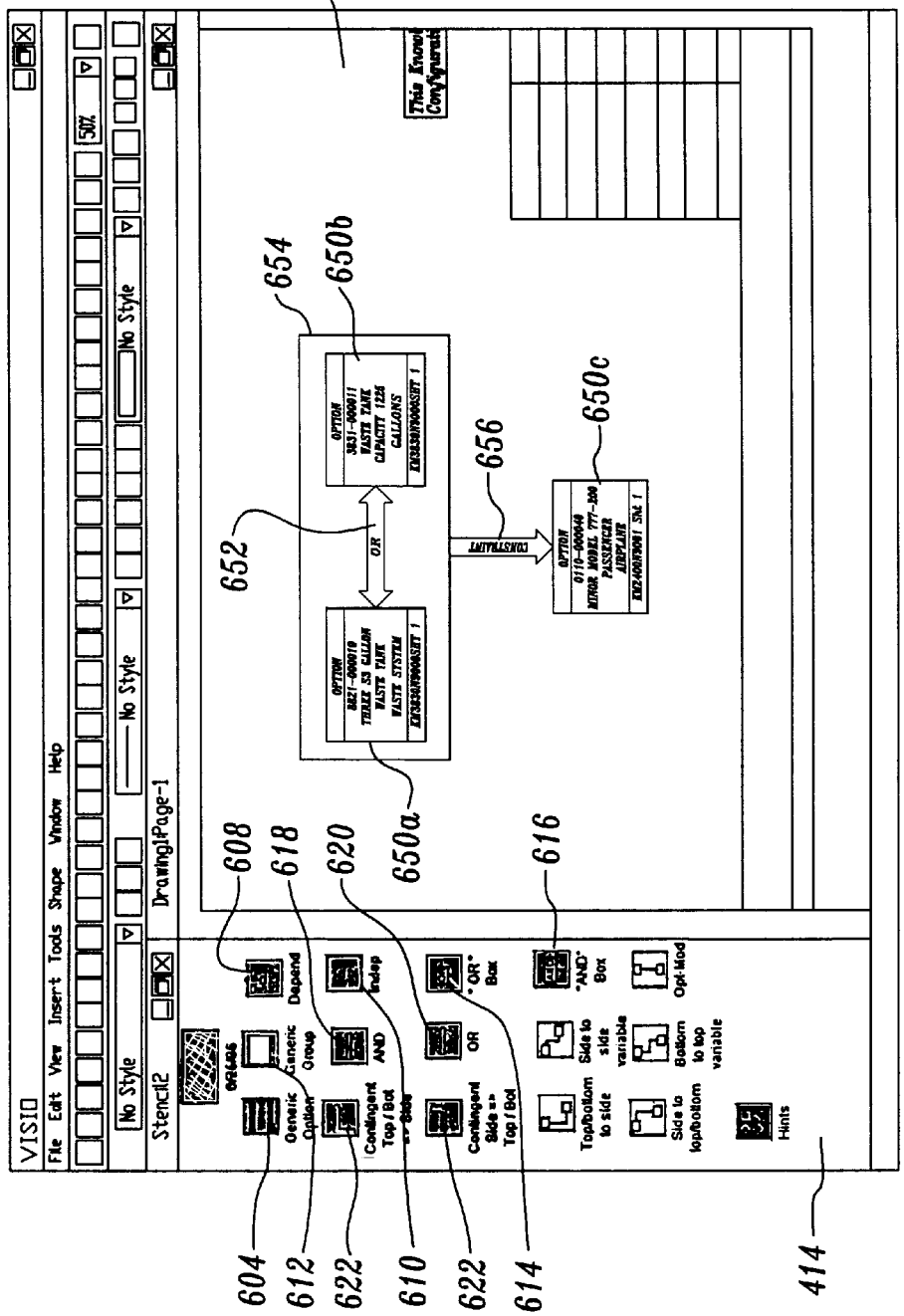

Fig. 9

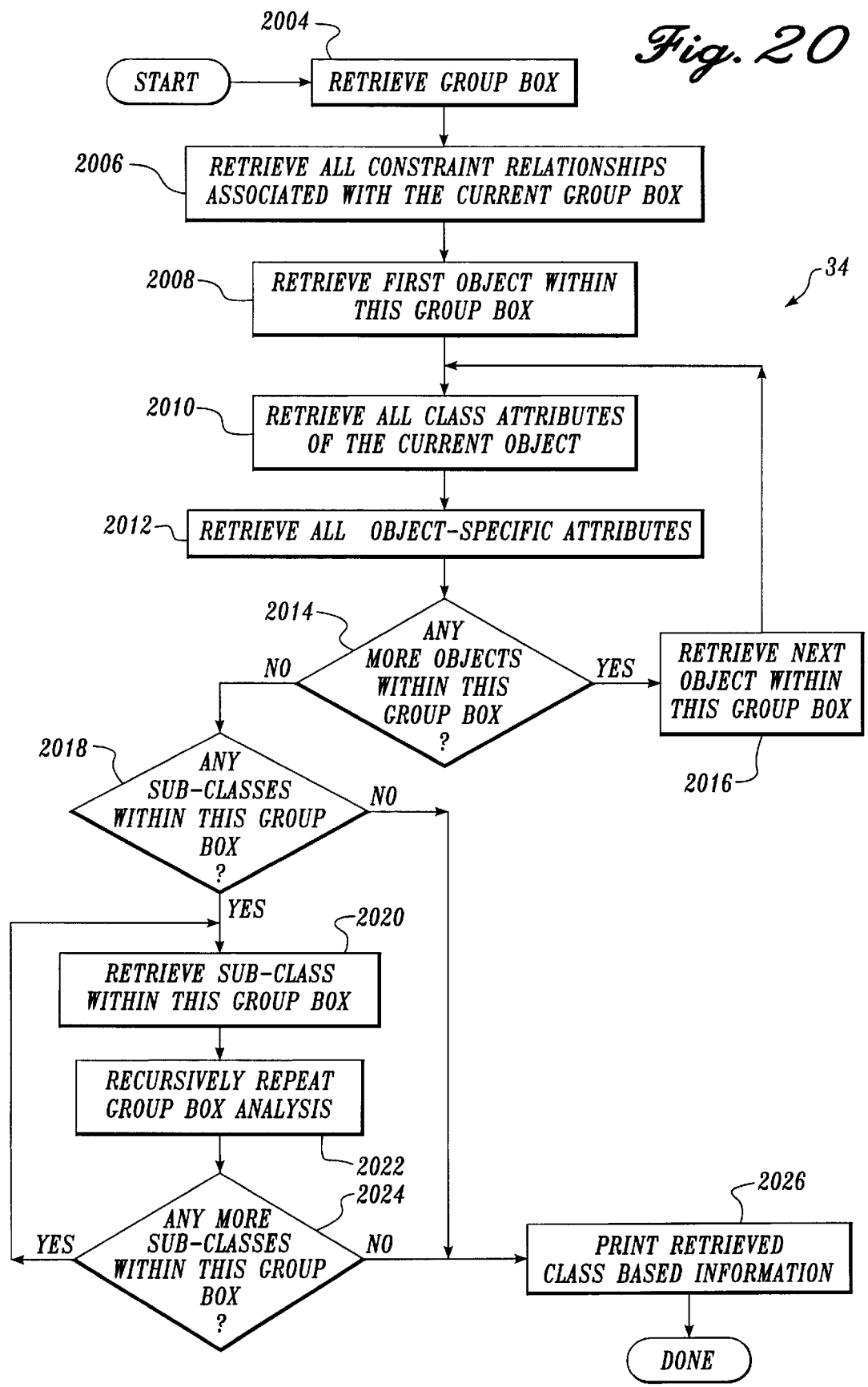

COMPUTER-BASED METHOD OF STRUCTURING PRODUCT CONFIGURATION INFORMATION AND CONFIGURING A PRODUCT

FIELD OF THE INVENTION

The present invention relates to product information systems and, in particular, to a method and apparatus for storing and graphically displaying product configuration information.

BACKGROUND OF THE INVENTION

Many businesses that sell products provide customers with a number of options that can be selected by the customer to configure a particular product. Generally, the selection of one or more options determines particular modules that are required for assembly of the product in order to provide the functionality described by the selected option(s). Modules may include parts, plans, tools, or software that are included in the product or used to assemble the product. Interrelationships between configuration options are such that the selection of a particular option may depend upon the selection of one or more other options. In addition, the selection of one or more options may preclude the selection of certain other options. In a product containing large numbers of modules, and where numerous options are presented to customers, the selection of options and production of a customized product configured according to the options selected is complex. The production of the product necessitates knowledge of the module requirements based upon the selected options, wherein the actual module requirements depend upon the particular combination of options selected. In the production of a product having a complex manufacturing system, knowledge of the relationships between options and the requirements resulting from the selection of options is often decentralized and not automated. Collating the necessary information requires reference to multiple individuals or other sources of information, which is expensive and time consuming.

The commercial aircraft industry provides an example of complex configurable products and customers who select from many options to customize the products. For example, the selection of a particular aircraft engine depends on particular functional requirements of the airplane, as well as customer preferences of engine manufacturers. A customer that desires an aircraft capable of takeoffs and landings at high altitude is restricted to a selection of aircraft engines that satisfy this requirement. A preference for a particular engine manufacturer further limits the possible selections of an aircraft engine. A customer may also desire an aircraft capable of flying long distances. Since aircraft engines have different capabilities, selection of a particular option may preclude selection of a particular second option. Similarly, selection of a particular functional option, such as the ability to fly long distances, may require the selection of a related option, such as an option for a smaller number of passenger seats, or a smaller cargo compartment. Once a particular option of an aircraft engine is selected, there follows a requirement for a particular module of parts necessary to accommodate the aircraft engine.

Many people are involved in designing and building a commercial aircraft. Various engineers have particular knowledge of portions of the aircraft, such as the aircraft engine, the aircraft cockpit, or the interior of the aircraft. A customer configuring an aircraft is presented with the selectable options and the relationship between the options. Providing this information to a customer may involve several people and the transferring of information from one person to another. Once the configuration discussions are complete, the requirements of modules that are to be included in the aircraft must be provided to the manufacturing teams.

As will be readily appreciated from the foregoing description, a need exists for a graphical representation of product information that allows a user to specify product options and, based on the user specifications, quickly and accurately determines the modules required to make up the chosen product configuration. Such a system optimally provides the user with a product "Map" that displays available product options and the constraints associated with particular choices.

A rules-based system is a data processing system that operates on some domain of knowledge. Knowledge about the domain and the logic that experts employ with respect to the domain are acquired and represented by a set of rules. An inference engine receives the set of rules and processes them in order to provide rational deductions from the rules. Rules-based systems are well known in the art, and inference engines are commercially available.

The acquisition of information and the creation of rules to be employed within a rules-based system is a complex task. A need exists for an improved method of acquiring information pertaining to product configurations and the generation of rules that can be input to an inference engine. A rules-based system employing such an improved method of information acquisition preferably will be used to validate product options selected by a customer and to assist in the configuration of a product in accordance with the selected product options.

SUMMARY OF THE INVENTION

In accordance with this invention, a computer based method of structuring product information and using the product information to produce a computer program that validates product selection options and configures a product is provided. The computer based method creates a Knowledge Map that graphically displays the information necessary to configure a product. A Knowledge Map may be an option-to-option Knowledge Map, which shows the relationship between product options, or an option-to-module Knowledge Map, which shows the modules required to make the product based on the selection of options. The computer based system includes a processor, memory, an input device, and a computer display device. In accordance with the invention, a pallet including a representation of graphical objects is displayed. A user selects graphical objects from the pallet and indicates a position in the display area where each of the objects is to be displayed. The graphical objects include a graphical option object, which represents information pertaining to a selection that may be made by a user when configuring the product. The graphical objects also include graphical logical relationship objects, specifically a conjunctive relationship object and a disjunctive relationship object, which are used to represent information necessary in configuring a product. A graphical module object that represents a product module is also included. Graphical option objects and graphical module objects include an identifier that corresponds to an entry in a database. The database stores and maintains information regarding product configuration options and requirements.

In accordance with further aspects of this invention, the pallet includes a graphical contingent relationship object representing a contingent relationship between graphical option objects or module objects. A contingent relationship indicates that the selection of one of the related objects is required for the selection of the second object.

In accordance with other aspects of this invention, the pallet also includes a graphical group box object, used to represent a grouping of product option objects. The grouping may be part of a relationship with other objects.

In accordance with other further aspects of this invention, the pallet includes a graphical constraint object representing a constraint relationship between two graphical objects.

In accordance with still other aspects of this invention, the system automatically maintains and verifies predefined constraints regarding the creation of a Knowledge Map. This includes verifying that a hard called-out option identifier associated with a graphical product object on a Knowledge Map is not used twice.

In accordance with still other further aspects of this invention, the system automatically retrieves the product information and produces a set of rules for use by a rules-based computer program to produce product configuration data.

As will be readily appreciated from the foregoing description, the computer based system and method quickly and accurately creates a Knowledge Map that graphically displays product configuration information. The invention provides a pallet of graphical objects that represent product information such as configuration options, modules, and the relationships between options or between options and modules. A user creates a graphical representation of the product configuration options, and enters information pertaining to each of the graphical objects. The invention allows a user to create a Knowledge Map containing the product configuration, quickly, efficiently, and accurately. Furthermore, modifications to the Knowledge Map representation are also made efficiently and accurately. The Knowledge Map provides a customer with a well organized description of the available options when determining a desired configuration of a complex product, such as a commercial aircraft.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 6 is an exemplary, pictorial representation of the screen of the system shown in FIG. 4, including a portion of a Knowledge Map;

FIG. 9 is a pictorial representation of a title block editor window;

FIG. 20 is a flow diagram illustrating the process of retrieving object-based information and generating object-based data.

DETAILED DESCRIPTION OF THE PREFERRED EMBODIMENT

The present invention provides a method for structuring and displaying product information, validating a selection of product options, and configuring a product based on the structured product information. Product information includes such data as product configuration options, modules, and the relationships between options or between options and modules. In the employment of the invention, a user gathers product information, or "knowledge," and creates a "Knowledge Map," which is a graphical representation of the knowledge. The Knowledge Map provides a user with a well-organized description of available product options and associated product module requirements. The user then retrieves the structured product information and creates a computer program that validates a customer's selection of product options and configures a product in accordance with the knowledge residing in the Knowledge Map. The validation and configuration program can be either a rules-based program or an object-based program, both of which are discussed in further detail below.

Figure 1:
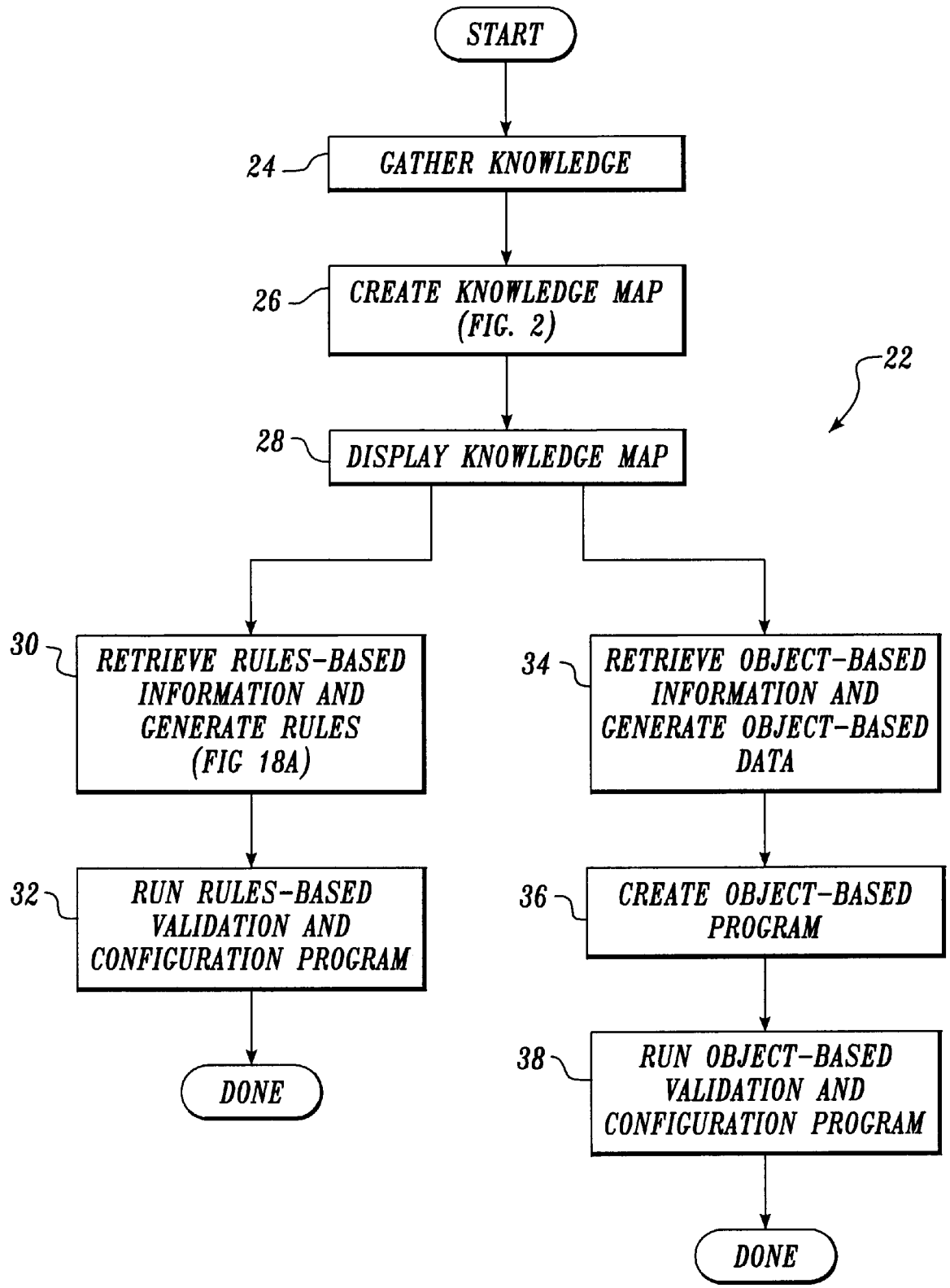
FIG. 1 is a flow diagram illustrating the process of creating a Knowledge Map and configuring a product, in accordance with the invention.

FIG. 1 is a flow diagram illustrating the process 22 of creating a Knowledge Map, validating a selection of product options, and configuring a product, in accordance with the invention. At step 24, knowledge pertaining to product options and product configurations is retrieved from one or more sources. The sources may include knowledgeable experts, computer data, or printed information. At step 26, the collective product information is used to create a Knowledge Map on a computer. At step 28, the computer displays the Knowledge Map.

At step 30, the product information stored within the computer is retrieved and used to automatically generate a set of rules in a form that serves as input to a rules-based computer program. The step of generating rules is discussed in further detail below. At step 32, a rules-based computer program is executed using the set of rules generated at step 30. The rules-based computer program performs an analysis on a set of product options corresponding to options selected by a potential purchaser of the product. The rules-based program also configures a product by determining the modules required to be included in the product, based on the set of product options selected.

Following step 28, the mechanism of the invention selectively proceeds to step 34. Step 34 and subsequent steps 36 and 38 are performed either in addition to steps 30 and 32 or as an alternative to steps 30 and 32. When performed in addition to steps 30 and 32, steps 34, 36 and 38 validate the accuracy of the rules-based program and rules produced steps 30 and 32.

At step 34, the product information gathered at step 24 and stored in the computer is retrieved and used to generate object-based data. The object-based data may be in one of a plurality of media, including displayed on a computer monitor, paper, or stored on a computer storage medium, such as a disk drive.

At step 36, an object-based program is created. Step 36 includes a computer programmer using the object-based data generated at step 34 to author a computer program. At step 38, the computer program created at step 36 performs validation and configuration analysis, as discussed above at step 32. The use of a rules-based program and an object-based program to validate product options and configure a product is discussed in further detail below.

Figure 2:
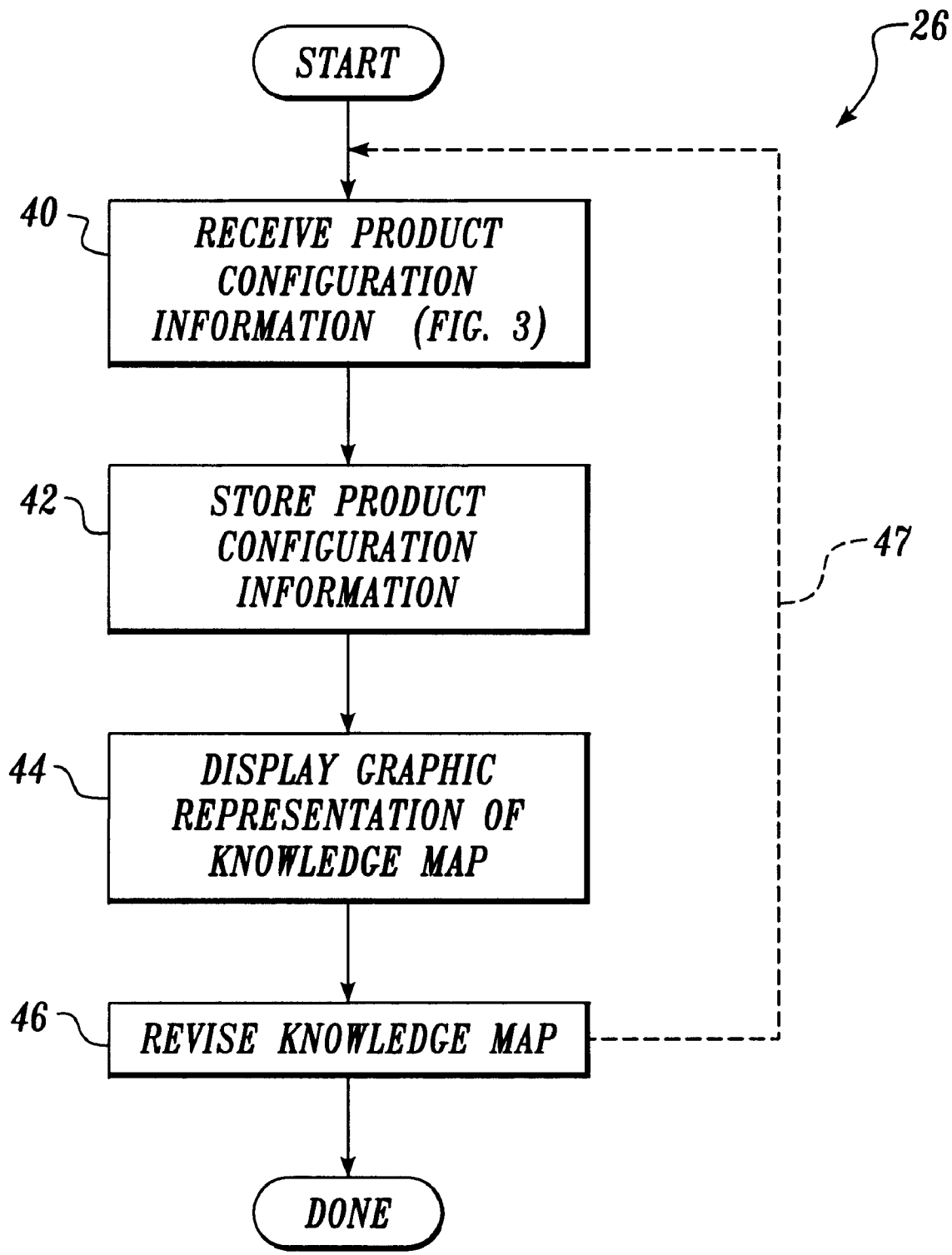
FIG. 2 is a flow diagram illustrating in further detail the process of creating a Knowledge Map, in accordance with the invention.

FIG. 2 illustrates in further detail the step 26 of creating a Knowledge Map. At step 40, product configuration information is received by the computer. At step 42, a computer program stores the product configuration information in a format that is useful for creating Knowledge Maps, as described in further detail below. At step 44, the computer program displays a graphic representation of a Knowledge Map. The computer displays the Knowledge Map on one or more of a plurality of media, including a computer monitor or paper.

At step 46, after reviewing the Knowledge Map, a user revises the Knowledge Map, editing the product configuration information on the computer to produce a desired Knowledge Map. As indicated by the dashed line 47, revising the Knowledge Map may include returning to step 40 and inputting additional product configuration information.

The invention can be employed to create two types of Knowledge Maps. An option-to-option Knowledge Map is used to configure a product. It contains options and relationships between the options. An option-to-module Knowledge Map is used to define the product. It contains options and modules, as well as relationships between options and modules.

Figure 3:
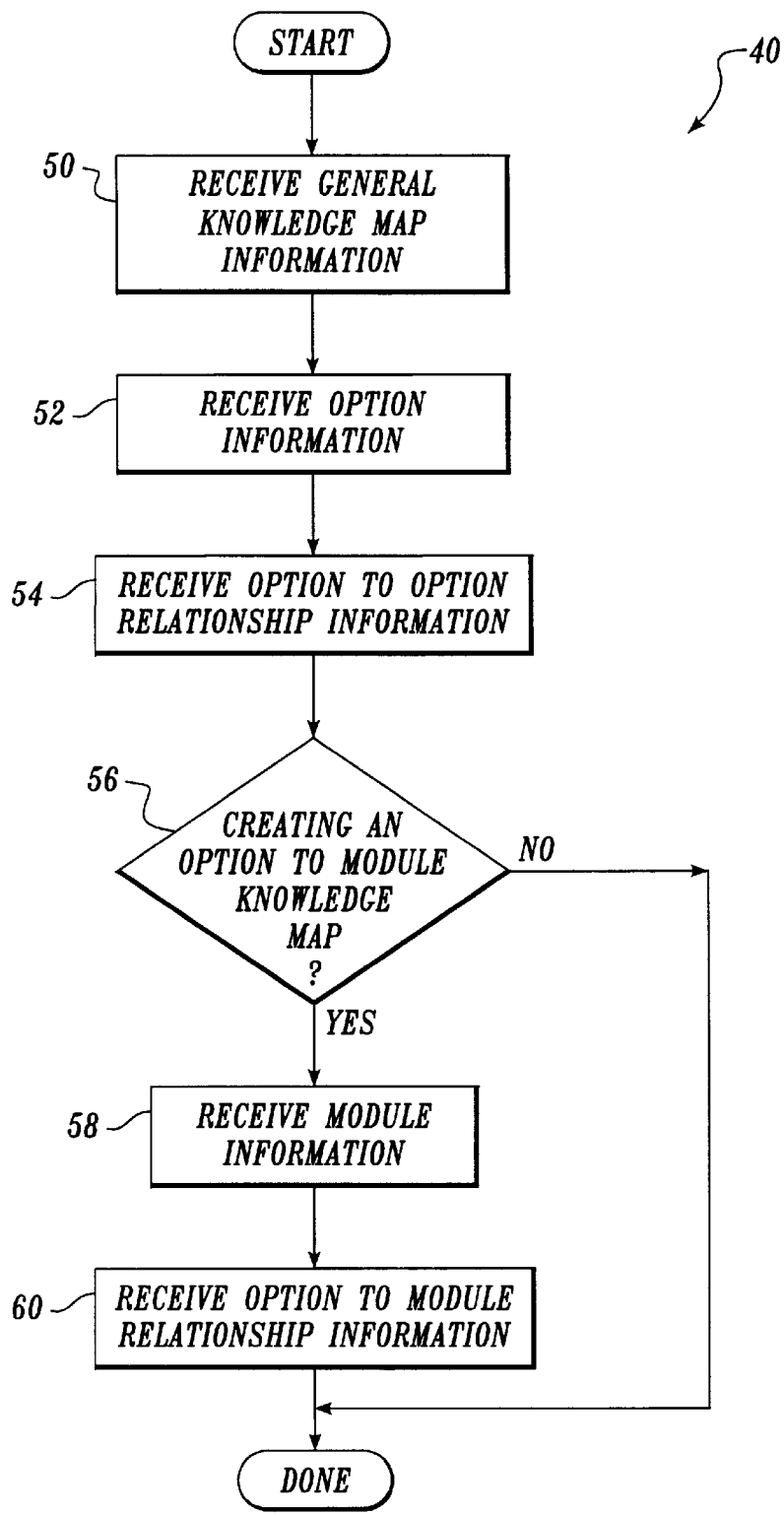
FIG. 3 is a flow diagram illustrating in further detail the process of inputting product configuration information, in accordance with the invention.

FIG. 3 illustrates in further detail the step 40 of receiving product configuration information. At step 50, the computer receives general Knowledge Map information. General Knowledge Map information includes a title of the Knowledge Map, a list of one or more authors, significant dates, and other administrative information. At step 52, the computer receives product option information. Product option information includes options that can be selected by a customer to customize one or more products.

At step 54, the computer receives option-to-option relationship information. Option-to-option relationship information describes relationships between product options. For example, the selection of one product option may require the selection of a second product option. Alternatively, the selection of one product option may preclude the selection of a second product option.

At step 56, a determination is made of whether an option-to-module Knowledge Map is being created. If it is determined that an option-to-module Knowledge Map is not being created, the process 40 of receiving product configuration information is complete. If, at step 56, it is determined that an option-to-module Knowledge Map is being created, the process continues at step 58, where the computer receives product module information. Modules includes parts, plans, tools, diagnostic tests, or software that are included in the product or used to assemble the product.

At step 60, the computer receives option-to-module relationship information. Option-to-module relationship information includes relationships between product options and project modules. For example, the selection of an option may require one or more particular modules to be included in the production of the product. The combination of product option information, product module information, and relationship information provides the data necessary to create a Knowledge Map, as described in further detail below. Preferably, the receipt of information in steps 50, 52, 54, 58, and 60 includes a user entering the information using a keyboard and mouse, or other appropriate input mechanisms.

Figure 4:
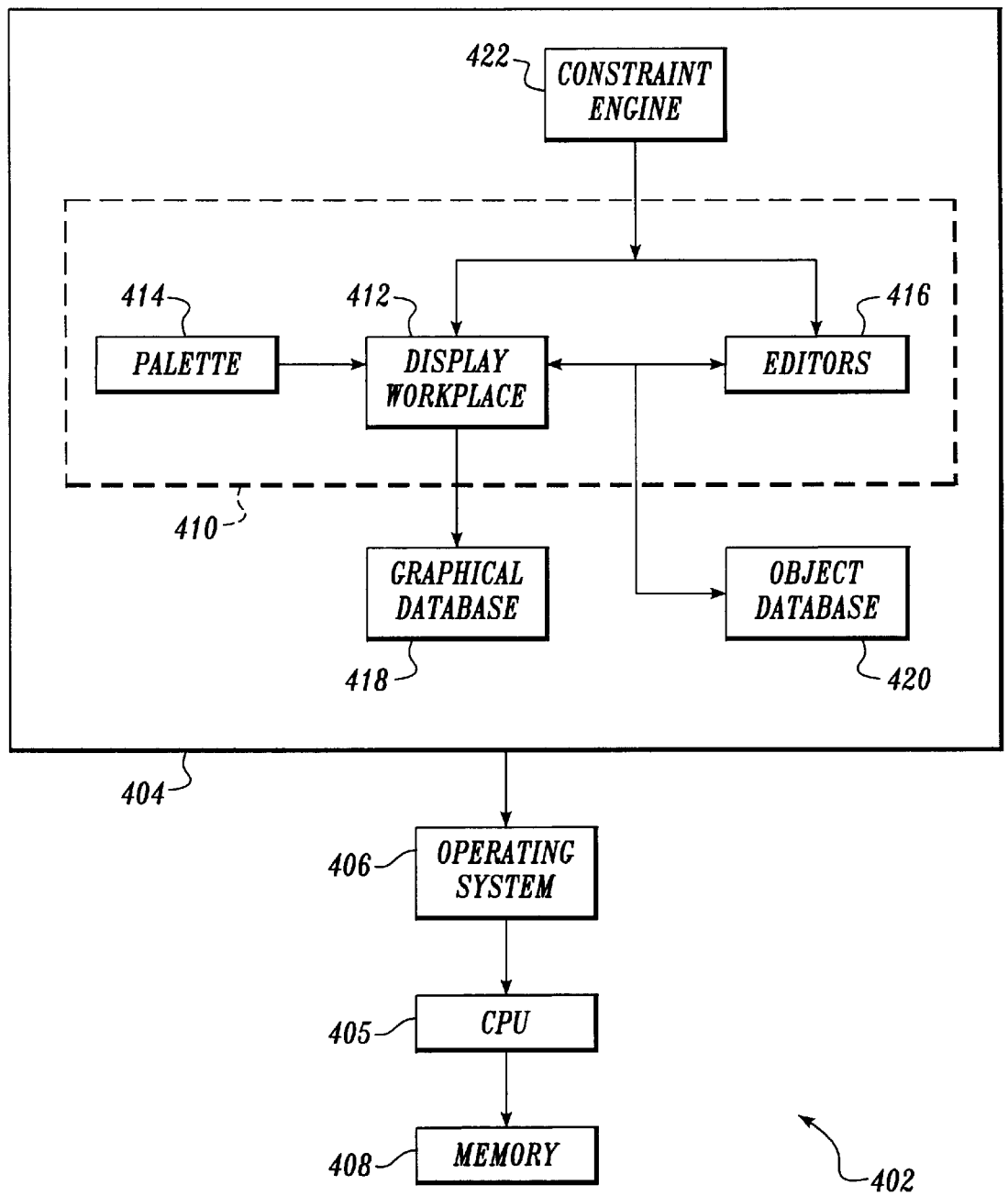
FIG. 4 is a block diagram of a computer based system formed in accordance with the invention.

A computer system 402 formed in accordance with the invention for graphically displaying and storing product information is illustrated generally in FIG. 4. The computer system 402 includes a graphical computer program 404 that runs on a central processing unit (CPU) 405 controlled by an operating system 406. A memory 408, connected to the CPU, generally comprises, for example, random access memory (RAM), read only memory (ROM), and magnetic storage media such as a hard drive, floppy disk, or magnetic tape. The CPU 405 may be housed within a personal computer, mini-computer, or a mainframe, as the benefits and functionality of the graphical computer program 404 may be implemented on a number of types of computers. In one actual embodiment of the invention, a graphical computer program formed in accordance with this invention runs on International Business Machine (IBM®) and IBM®-compatible personal computers. When used with IBM and IBM-compatible personal computers, the operating system 406 preferably utilizes a windowing environment, such as Microsoft Windows®, Microsoft Windows 95®, or Microsoft Windows NT®.

The graphical computer program 404 includes a user interface 410 that presents information to, and receives input from, an operator. The user interface is shown in functional form. In reality, it includes hardware (CRT display, keyboard, mouse, etc.) and software (high level graphical programs, such as Visio®, described below). Functionally, the user interface 410 includes a display workspace 412, a Knowledge Map palette 414, and a plurality of editors 416. The display workspace 412 displays graphical objects and is itself a graphical editor, permitting manipulation of displayed graphical objects, as described further below. The Knowledge Map palette 414 displays a palette of graphical objects, and allows an operator to select a particular type of graphical object for placement in the display workspace 412. Each type of graphical object has an associated editor 416 for editing data pertaining to a particular instance of a graphical object. The graphical object editors are discussed in further detail below.

One actual embodiment of the invention employs the Visio® 4.0 computer program, by Visio Corporation, of Seattle, Wash., to provide the display workspace 412 and palette 414. The Visio® program provides a palette 414, referred to as a tool box, that includes a number of master shapes, such as boxes, diamonds, or arrows.

Using an input device, such as a mouse, an operator selects one of the master shapes and drags an icon representing the master shape from the Knowledge Map palette 414 to a particular location within the display workspace 412. The Visio® program then displays the selected master shape at the selected position. Visio® also provides tools to manipulate a shape once it has been placed in the display workspace 412.

The Visio 4.0 system utilizes an object-oriented paradigm. In such a paradigm, a particular shape drawn on the computer screen is a graphical object, having certain attributes that define the object. The master shapes represent classes of objects. When an operator selects a master shape, or object class, and a corresponding location on the computer screen, an object corresponding to an instance of the selected class is created and displayed graphically on the computer screen. Generic attributes of the object, such as size and color, are initialized to default values and may be subsequently modified by an operator.

In an object-oriented paradigm, a class is defined by its attributes. Objects, or instances, within the class include all class attributes. A subclass of a class may be defined, wherein the subclass "inherits" the attributes of the parent class. The inherited attribute values may be modified, or new attributes added to the subclass. An object of the subclass correspondingly obtains the attributes of the subclass. Through "multiple inheritance," an object may be created that is a member of more than one class. Such an object obtains the attributes of all of its parent classes. A hierarchy including classes, subclasses, and objects is useful to organize and understand the numerous objects in a complex system.

The graphical computer program 404 also includes a graphical database 418 and an object database 420 for maintaining information pertaining to graphical objects and product information. The graphical database 418 maintains data pertaining to the graphical aspects of each object. This includes information such as the coordinates and dimensions of a graphical product object, formatting information of graphics and text, and graphical relationships between objects, such as which of two objects is displayed on top of the other object. The object database 420 maintains information pertaining to the products and options themselves, as described further below. As will be apparent to one skilled in this art, and others, the graphical database 418 and object database 420 can be combined into one database, or functionally divided in different ways. Visio® 4.0 includes a graphical database 418 that maintains coordinate, size, and formatting information for graphical objects.

The graphical computer program 404 further includes a constraint engine 422 for maintaining constraints, or limitations imposed on an operator manipulating the graphical product objects. These constraints include graphical constraints, such as whether a particular graphical object can be moved, resized, or reformatted. They also include product constraints, such as whether two particular types of graphical objects can be linked together. The particular constraints maintained and enforced by the constraint engine 422 are described in further detail below.

In accordance with the invention, the system illustrated in FIG. 4 is used to create a Knowledge Map. A Knowledge Map is a graphical representation of product options, product modules, and the relationships between product options and product modules. It serves to document how options interact with other options when configuring a particular product. An option-to-option Knowledge Map is useful in the selection of options during the configuration of a product. An option-to-module Knowledge Map indicates the modules that must be included in the production of the product in order to achieve the selected configuration. A Knowledge Map comprises one or more sheets, each sheet describing a particular area of the Knowledge Map. FIG. 6 illustrates a portion of a Knowledge Map displayed within the display workspace 412 on a computer screen. FIGS. 7A–7E also illustrate portions of Knowledge Maps. Prior to discussing Knowledge Maps in detail, the hierarchy of elements that compose a Knowledge Map are discussed.

Figure 5A:
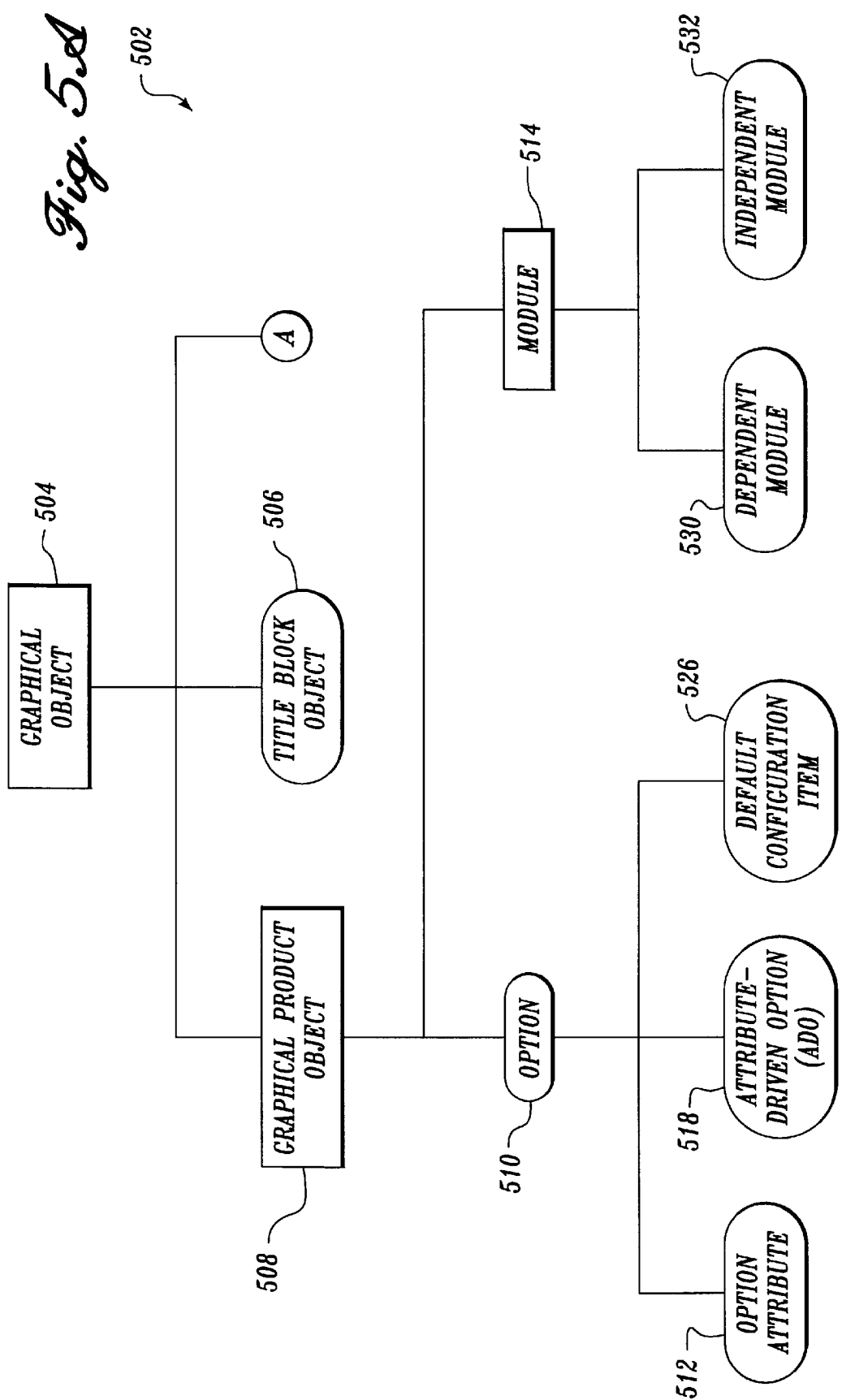
FIGS. 5A–B illustrate the class hierarchy of the computer based system shown in FIG. 4.
Figure 5B:
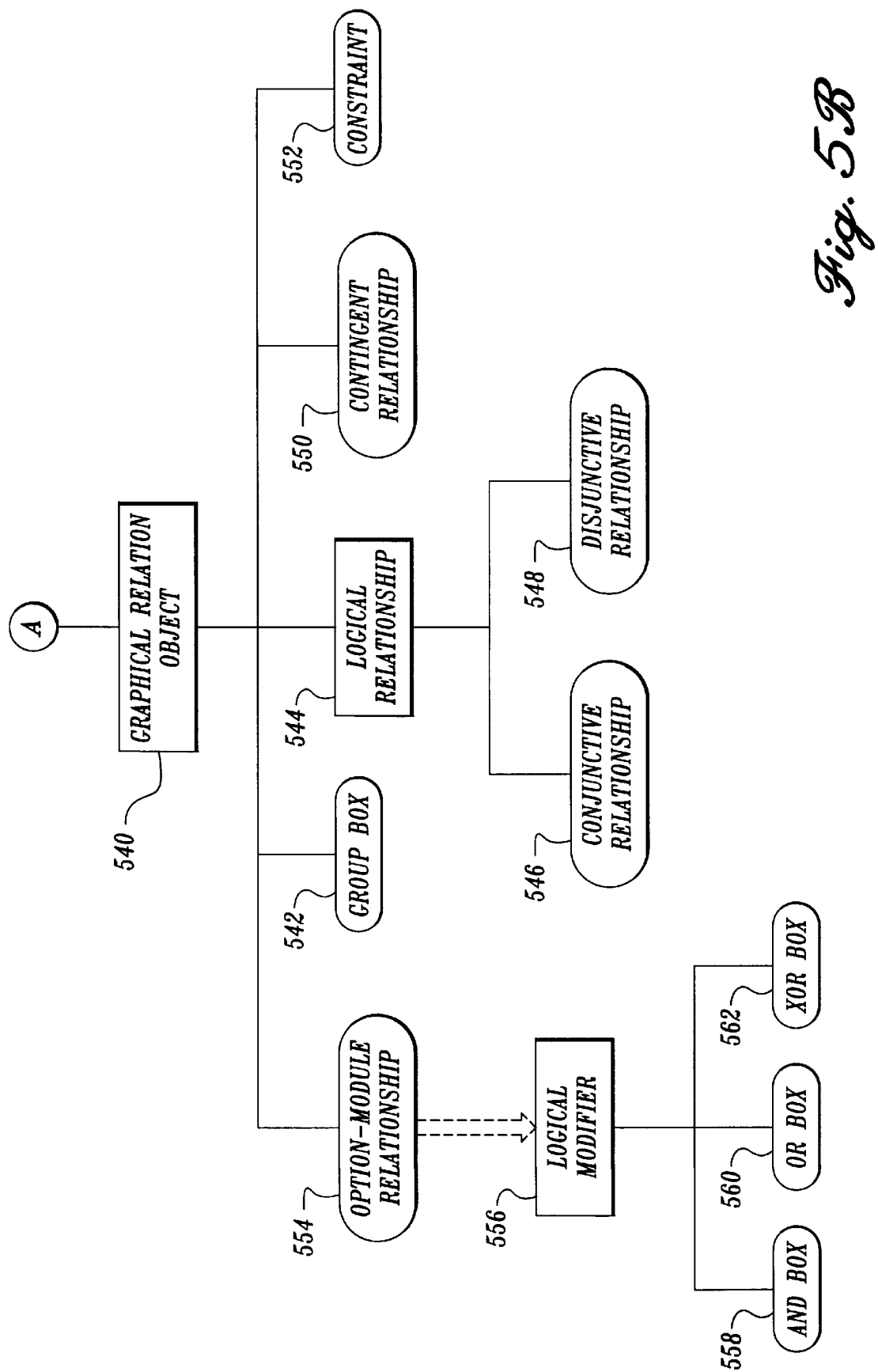

FIGS. 5A–B illustrate the class hierarchy 502 of the graphical objects that are used to create a Knowledge Map in accordance with the present invention. The rounded boxes in FIGS. 5A–B indicate classes of graphical objects selectable by an operator for placement on a Knowledge Map. The rectangular boxes indicate classes of graphical objects that are used to organize and show the relationship between graphical objects. FIGS. 7A–7E, which are exemplary portions of Knowledge Maps, illustrate Knowledge Maps containing the selectable objects of FIGS. 5A–B. Prior to discussing the objects in detail, a brief overview of the objects and their position within a class hierarchy is presented. At the top of the hierarchy 502 is the class of graphical objects 504 that are displayed and manipulated within the display workspace 412. Below the class of graphical objects are three subclasses. One subclass includes title block objects 506, another includes graphical product objects 508, and the third includes graphical relation objects 540. The title block objects 506 are objects that control the display of information contained in a Knowledge Map Sheet information block, such as the title of the sheet, the authors, and the dates the sheet was created. In one actual embodiment, the information block is located in the lower right corner of the Knowledge Map Sheet.

The class of graphical product objects 508 has two subclasses: a class of options 510 and a class of modules 514. The class of options 510 has three subclasses: a class of option attributes 512; a class of attribute driven options (ADOs) 518; and a class of default configuration items 526.

ADOs 518 are specific type of options. ADOs require that further selections be made before the option is given a complete option number. The further selections are the option attributes 512, which fully define the option. An option attribute can be associated with one or more ADOs. The default configuration items are default options that come into existence if no selection is made from a group of options containing a default configuration item.

An option object can be either a hard called-out option or a reference option. A hard called-out option represents a specific product option, selectable by a customer, that has a unique option number. The location of the hard called-out option is where the option is defined and all relationships between that option and other options are found. Each product option, as identified by an option number, can have no more than one corresponding hard called-out option on a Knowledge Map. Where a particular hard called-out option must be referred to on a page or sheet of a Knowledge Map other than the sheet where the particular instance is defined a reference option is used. A reference option contains information referring to a hard called-out option and is used to represent the hard called-out option. Each of the four types of options (option 510, ADO 518, option attribute 512, or default configuration item 526) must be either a reference option or a hard-called-out option. For example, an ADO must be either a reference ADO or a hard called-out ADO. All options must be hard called-out once.

The modules 514, represent sets, or packages, of parts, plans, tools, functional tests, inspections, or software that are to be included in the product or used to assemble the product when one or more associated options are selected. The class of modules 514 has two subclasses: a class of dependent modules 530 and a class of independent modules 532. Dependent modules 530 include modules that have a relationship with two or more options, such that when the two or more options are selected, the use of an associated dependent module is required. Independent modules 532 include modules that are related to one or more options. An independent module is configured upon the selection of exactly one option. The use of dependent and independent modules is explained in further detail below.

The class of graphical relation objects 540 is a class of objects that are used to define relationships between components, where a component is a graphical product object 508 or a group box containing two or more graphical product objects. The class of graphical relation objects 540 includes five subclasses: a class of group boxes 542; a class of logical relationships 544; a class of contingent relationships 550; a class of constraints 552; and a class of option-module relationships 554. Group boxes 542 combine graphical product objects 508 into groups. A group box 542 is represented graphically in FIGS. 7A–7D by a rectangle surrounding one or more of the graphical product objects 508 that comprise a group. A group box 542 can be nested within another group box 542. For example, in FIG. 7A, group boxes 726, 736, and 746 are contained within group box 440.

Logical relationships 544 are represented graphically in FIGS. 7A–7D by a two-way arrow between two components. Logical relationships 544 define the logical relationship between the two components that it links. The class of logical relationships 544 includes two subclasses: a class of conjunctive relationships 546 and a class of disjunctive relationships 548. Disjunctive relationships 548 define a disjunctive, or "OR" relationship. The disjunctive relationship 548 represents an exclusive OR relationship between two components, where a component is graphical product object 508 or a group box 542 containing two or more graphical product objects. A selection of one component that is connected by a disjunctive relationship precludes the selection of all other components connected to the selected component by a disjunctive relationship.

Conjunctive relationships 546 define a conjunctive, or "AND" relationship between two components, where a component is graphical product object 508 or a group box 542 containing two or more graphical product objects. A selection of one component that is connected by a conjunctive relationship requires the selection of all other components connected to the selected component by a conjunctive relationship.

Contingent relationships 550 define a contingent relationship between two components, and are more fully discussed below. Constraints 552 represent an operator-defined constraint between two graphical product objects 508 or group boxes 542.

Option-module relationships 554 represent a required relationship between an option 510, or a group box enclosing at least one option, and a module 514. Options 510 (or group boxes 542) linked to a module 514 provide the information that a selection of the option (or group box) requires the inclusion of the linked module in the production of the final product. Option-module relationships include an identifier that corresponds to text on a Knowledge Map that explains the relationship.

An option-module relationship 554 can have an associated logical modifier 556 when used to indicate a requirement relationship with two or more options. A logical modifier 556 specifies a logical relationship between the connected options that must be satisfied in order for the connected module 514 to be required. The logical modifier 556 can be an "AND" box 558, an "OR" box 560, or an "XOR" box 562. An AND box 558 indicates that the connected module is required if all of the options connected to the AND box are selected. An OR box 560 indicates that the connected module is required if any one or more of the options connected to the OR box are selected. An XOR box 562 indicates that the connected module is required if exactly one of the options connected to the XOR box is selected. An option-module relationship 554 that has an associated logical modifier 556 is referred to as a logical option-module relationship. An option-module relationship 554 that does not have an associated logical modifier 556 is referred to as a non-logical option-module relationship. Use of the option-module relationship and associated logical modifiers is explained below.

The class hierarchy 502 of the graphical objects that are used to create a Knowledge Map illustrates the inheritance of object characteristics. Objects that are instantiated from subclasses of parent classes have the characteristics of an object of the parent class, unless specifically modified. In the discussion that follows, references to a particular object illustrated in the hierarchy of FIGS. 5A–B refer to the object, and all objects that are instantiated from its descendent subclasses, unless explicitly stated otherwise. For example, reference to an option 510 refers to an option attribute 512, an attribute driven option 518, and a default configuration item 526, as well as an option 510. Similarly, reference to a module 514 includes the dependent module 530 and the independent module 532.

FIG. 6 is a pictorial representation of a portion of the user interface 410 (FIG. 4) of the graphical computer program 404. The user interface 410 includes the pallet 414 containing the iconic representations of graphical objects that are selectable by an operator. The iconic representations include: an option icon 604; a dependent module icon 608; an independent module icon 610; a group box icon 612; an OR box icon 614; an AND box icon 616; a conjunctive relationship icon 618; a disjunctive relationship icon 620; two contingent relationship icons 622; plus other icons not relevant to this invention. The iconic representations within the pallet 414 are best discussed with reference to the class hierarchy illustrated in FIG. 5.

The option icon 604 graphically represents an option object 510, which a user can specify to be either a hard called-out option or a reference option. The dependent module icon 608 graphically represents the dependent module 530. The independent module icon 610 graphically represents the independent module 532. The group box icon 612 graphically represents the group box 542. The OR box icon 614 graphically represents an OR box 560 modifier of an option-module relationship 554. The AND box icon 616 graphically represents an AND box 558 modifier of an option-module relationship 554. The conjunctive relationship icon 618 graphically represents the conjunctive (and) relationship 546. The disjunctive relationship icon 620 graphically represents the disjunctive relationship 548. As will be discussed further below, an editor can be used to enter information describing a logical relationship.

The display workspace 412 contains graphical representations of the objects selected by an operator and positioned within the display workspace 412. Depicted in the display workspace 412 of FIG. 6 are several graphical representations, including graphical representations of three reference options 650*a*, 650*b*, and 650*c*. Two of the reference options 650*a* and 650*b* are linked by a disjunctive relationship 652. These two reference options 650*a* and 650*b* are also enclosed in a group box 654. The group enclosed by the group box 654 is linked to the third reference option 650*c* by a contingent relationship 656.

The contingent relationship 656 indicates that the acceptance of a customer selection of the contents of the group box 654 is contingent upon a selection of the third reference option 650*c*. That is, a selection of the contents of the group box 654 requires that a selection of the option 650*c* also be made. Note that the contingent relationship 656 is one-directional. It does not represent a restriction on the selection of the reference option object 650*c*. Since the first and second reference options 650*a* and 650*b* are linked by a disjunctive relationship, the selection of the contents of the group box 654 means that one and only one of the two reference options 650*a* and 650*b* can be selected.

A Knowledge Map of the type depicted in FIG. 6 allows a customer to select one of the following combinations of product options: the first and third options 650*a* and 650*c*; the second and third options 650*b* and 650*c*; or the third option 650*c*. In particular, note that, as depicted, a customer cannot select both the first and second options 650*a* and 650*b*. Also, it is not necessary to select either option 650*a* or 650*b* in order to select the third option 650*c*. The use and interpretation of Knowledge Maps such as the one depicted in FIG. 6 are discussed in greater detail below.

Figure 7A:
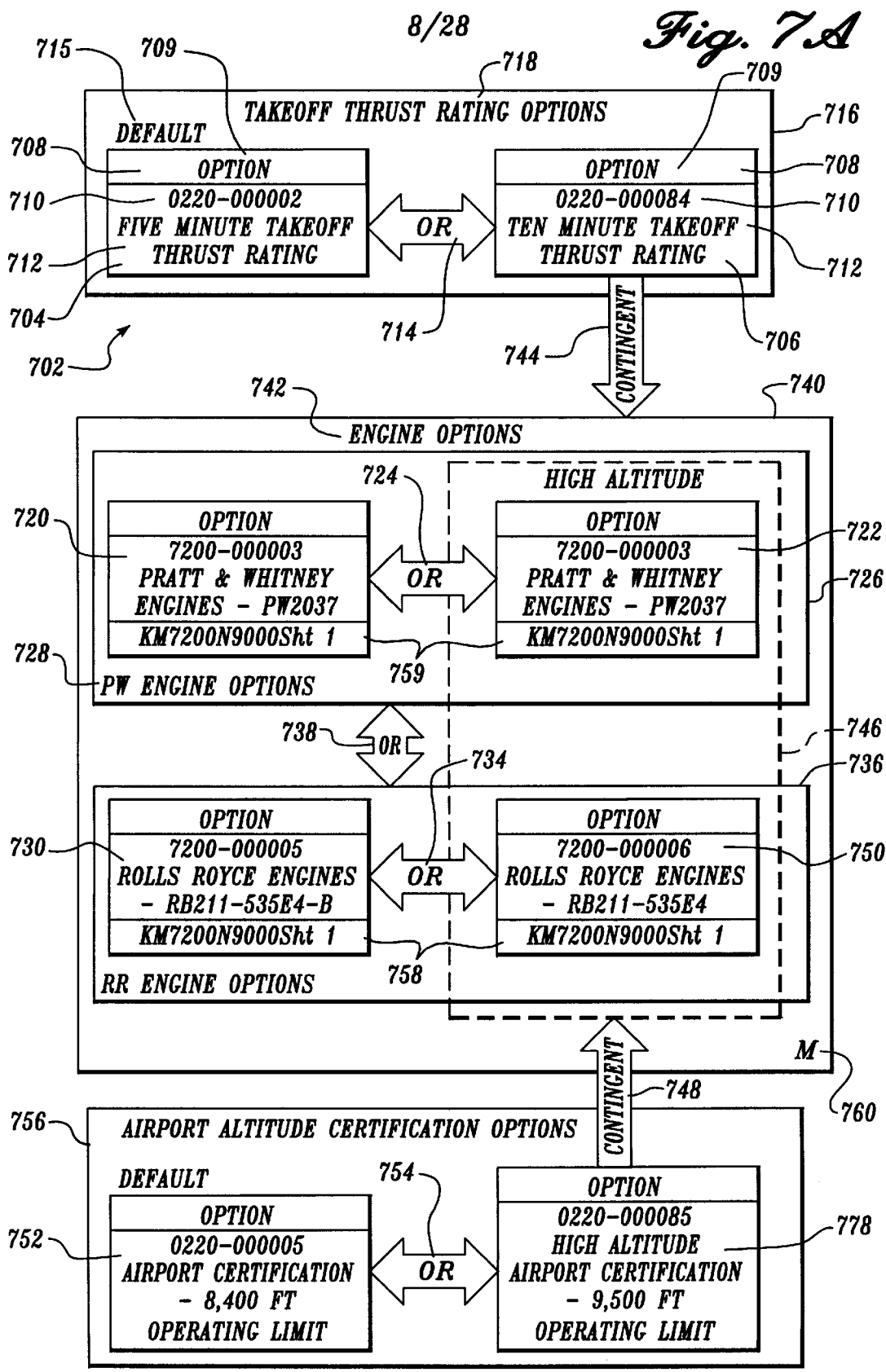
FIGS. 7A–7E illustrate exemplary Knowledge Maps.

FIG. 7A illustrates a portion of another exemplary option-to-option Knowledge Map 702. Hard called-out options 704 and 706 are represented as rectangles having a top rectangular portion 708 shaded black with the object title 709 "Option" printed in white. An option identifier 710 and an option name 712 is displayed beneath the title 709. The "five minute takeoff" option 704 and the "ten minute takeoff" option 706 are linked by a logical relationship, in particular a disjunctive relationship 714. As discussed above, the disjunctive relationship 714 defines a relationship between two options or groupings of options such that either one of the options (or groupings) can be selected, but not both. The disjunctive relationship 714 depicted in FIG. 7A indicates that a customer has a choice of either the "five minute takeoff" option 704 or the "ten minute takeoff" option 706, but not both. A group box 716 encloses option 704 and option 706. The text 718 at the top of the group box 716 describes the meaning of the group box 716.

When a disjunctive relationship links options, one of the options can be selected as the default. The default option represents the default selection if an operator does not make a selection. As depicted in FIG. 7A, the marking 715 "Default" near the top left corner of the "five minute takeoff" option 704 indicates that option 704 is the default option if a customer does not make a selection between option 704 and option 706.

Reference options 720 and 722 are similarly linked by a disjunctive relationship 724. A group box 726 encloses options 720 and 722, and is labeled with a group box label 728. Reference options 730 and 732 are joined by a disjunctive relationship 734, and are enclosed by a group box 736.

A disjunctive relationship 738 links group boxes 726 and 736. The disjunctive relationship 738 represents a customer choice between the options enclosed within the group boxes 726 and 736. More specifically, a customer has a choice between group boxes 726 and 736. If the customer selects group 726, there remains a choice between options 720 and 722, the choice being designated by a disjunctive relationship 724. If the customer selects group box 736, there remains a choice between options 730 and 732, the choice being designated by a disjunctive relationship 734. The result is that a customer has a choice of at most one option among the options 720, 722, 730, and 732. These options, and the group boxes 726 and 736 are enclosed by a group box 740 having a label 742 that comprises the text "Engine Options." The configuration contained within group box 740 represents the product information that a customer has a choice of at most one engine option.

A contingent relationship 550 (FIG. 5) defines a contingent relationship between two components, wherein a component can be either a graphical product object 508 or a group box 542 containing one or more graphical product objects. The contingent relationship 550 is represented as a one-directional arrow connecting the two components and pointing toward the "independent" component. The component away from which the contingent relationship arrow points is the dependent component. A contingent relationship 550 represents the information that the selection of the dependent component is contingent upon, or requires, the selection of the independent component. The converse is not true. That is, a selection of the independent component does not require that a selection of the dependent component be made. In FIG. 7A, a contingent relationship 744 links option 706 and group box 740. As depicted in FIG. 7A, the contingent relationship 744 represents the information that the selection of the "ten minute takeoff" option 706 (the dependent component) is contingent upon the selection of an option within the "engine options" group box 740 (the independent component). More specifically, option 706 cannot be selected unless an option in group box 740, as discussed above, is selected.

As shown in FIGS. 5A and 5B, and described above, disjunctive relationships 548 and contingent relationships 550 are used to represent relationships between two graphical objects 504. As illustrated in FIG. 7A, and as described above, a graphical object that is joined by a relationship object can be either an option (i.e., option 706), or a group box (i.e., group box 740) containing one or more options. Group boxes and relationships can be nested to any level. As illustrated in FIG. 7A, group boxes 726, 736 are contained within the "engine options" group box 740. Within a group box that is a component of a relationship, further relationships may exist. Group boxes may also overlap. Group box 746 encloses options 722 and 732, which are enclosed by group boxes 726 and 736, respectively. Group box 746 is used as a component in another relationship, linked by a contingent relationship 748. The contingent relationship 748 links an option 750 with the group box 746. Option 750 is also linked with another option 752 by a disjunctive relationship 754. Options 750 and 752 lie within a group box 756.

A graphical relation 540 can link two components, regardless of the components' position in a nested relationship. For example, as depicted in FIG. 7A, contingent relationship 748 presents the information that a selection of the option 750 is contingent upon the selection of an option within the group 746. The existence of the option 750 within a group box 756 is not significant in determining the relationship represented by contingent relationship 748. Also, as depicted, the option 750 is contingent only upon the group represented by the group box 746, even though the contingent relationship 748 crosses the boundary of the group box 740.

The depicted group box 740 includes an indicator symbol 760 that represents the information that a selection from the group 740 is mandatory. In one actual embodiment of the invention, the letter "M" is used as the indicator symbol 760. A group box having the mandatory indicator symbol 760 must be selected by a customer when configuring the product for a complete product definition The Knowledge Map of FIG. 7A represents the following information regarding the selection of options to configure a commercial aircraft. A customer can select a takeoff thrust rating option, which is represented by the group box 716. This selection must be a choice between a five minute takeoff thrust rating (option 708) or a ten minute takeoff thrust rating (option 706).

The selection of the ten minute takeoff thrust rating is contingent upon, and therefore requires, a selection of an engine option (group box 742). As indicated by the "mandatory" symbol 760, the selection of an engine option is required even if the ten minute takeoff thrust rating is not selected. The selection of an engine option requires the selection of either a Pratt and Whitney (PW) engine option (group box 728) or a Rolls Royce (RR) engine option (group box 736). A PW engine option can be either a PW2037 engine (option 720) or a PW2040 engine (option 722). An RR engine option can be either an RB211-535E4-B engine (option 730) or an RB211-535E4 engine (option 732).

A customer can also select an option for airport altitude certification (group box 756). Within this selection, a certification of up to 8,400 feet (option 752) is the default, if a selection is not explicitly made. If the alternative option, of a certification up to 9,500 feet (option 750) is selected, the customer must also select an engine capable of high altitudes, as represented by the group box 746. The contingent relationship 748 expresses this requirement.

Note that the contingent relationships 744 and 748 are one-directional. A customer may select a high altitude engine without selecting a high altitude certification or a ten minute takeoff thrust rating.

In FIG. 7A, options 704, 706, 750, and 752 are hard called-out options. Options 720, 722, 730, and 732 are reference options. Preferably, reference options are distinguished visually from hard called-out options. As depicted in FIG. 7A, the reference options 720, 722, 730, and 732 include rectangular shaded areas 758 at the bottom of the rectangles representing the options, with the text 759 therein displayed in white. The text includes the drawing number on which the referenced option appears as a hard called-out option.

Figure 7B:
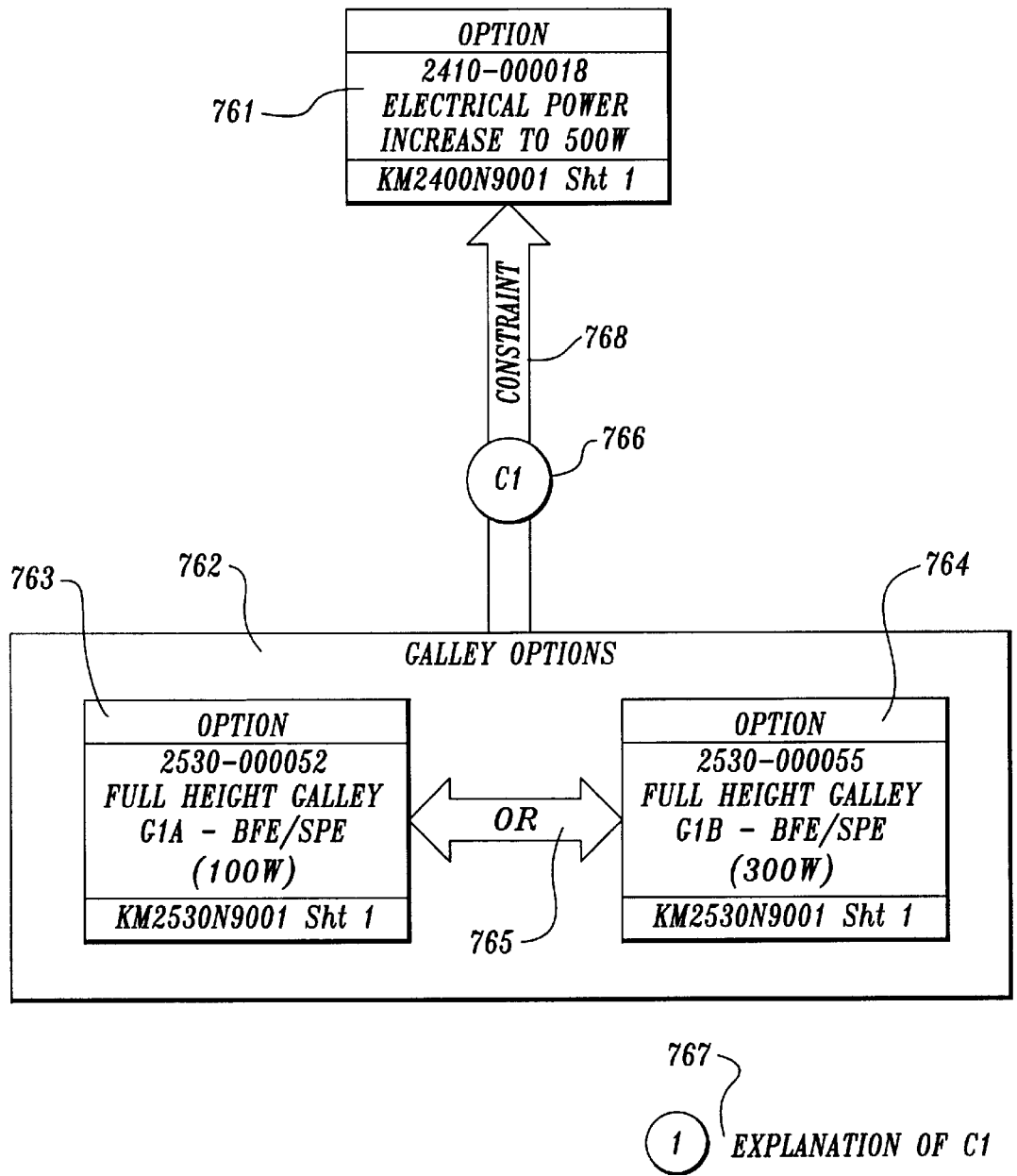

A constraint relationship links two graphical product objects or group boxes. FIG. 7B illustrates a constraint relationship 768, graphically represented as an arrow with a pointer at one end. A constraint relationship depicts a limiting factor, or consuming requirement, between two product objects or group boxes. A constraint relationship 768 has an associated identifier 766 that corresponds to text 767 explaining the constraint. The text 767 explanation does not need to explain the reason for constraint, but preferably provides the precise constraining rule between the two objects. As depicted in FIG. 7B, the 500W electrical power option 761 is connected by the constraint relationship 768 to a "galley options" group box 762. The galley options group box 762 includes a 100W galley option 763 and a 300W galley option 764, which are connected by a disjunctive relationship 765. The 100W galley option 763 requires 100 watts of power. The 300W galley option 764 requires 300 watts of power. A constraint relationship text 767 that explains the constraint 768 between the galley options group box 762 and the 500W power option 761 may provide the following text: "Power required for galley option $\leq$ power available." During configuration, the configuration software then subtracts 100W or 300W, depending on the galley option selected, from the 500W power supply option 761, leaving 400W or 200W for other options requiring power. If the result is less than zero, then either an error message is displayed or another power supply must be brought into the system.

Figure 7C:
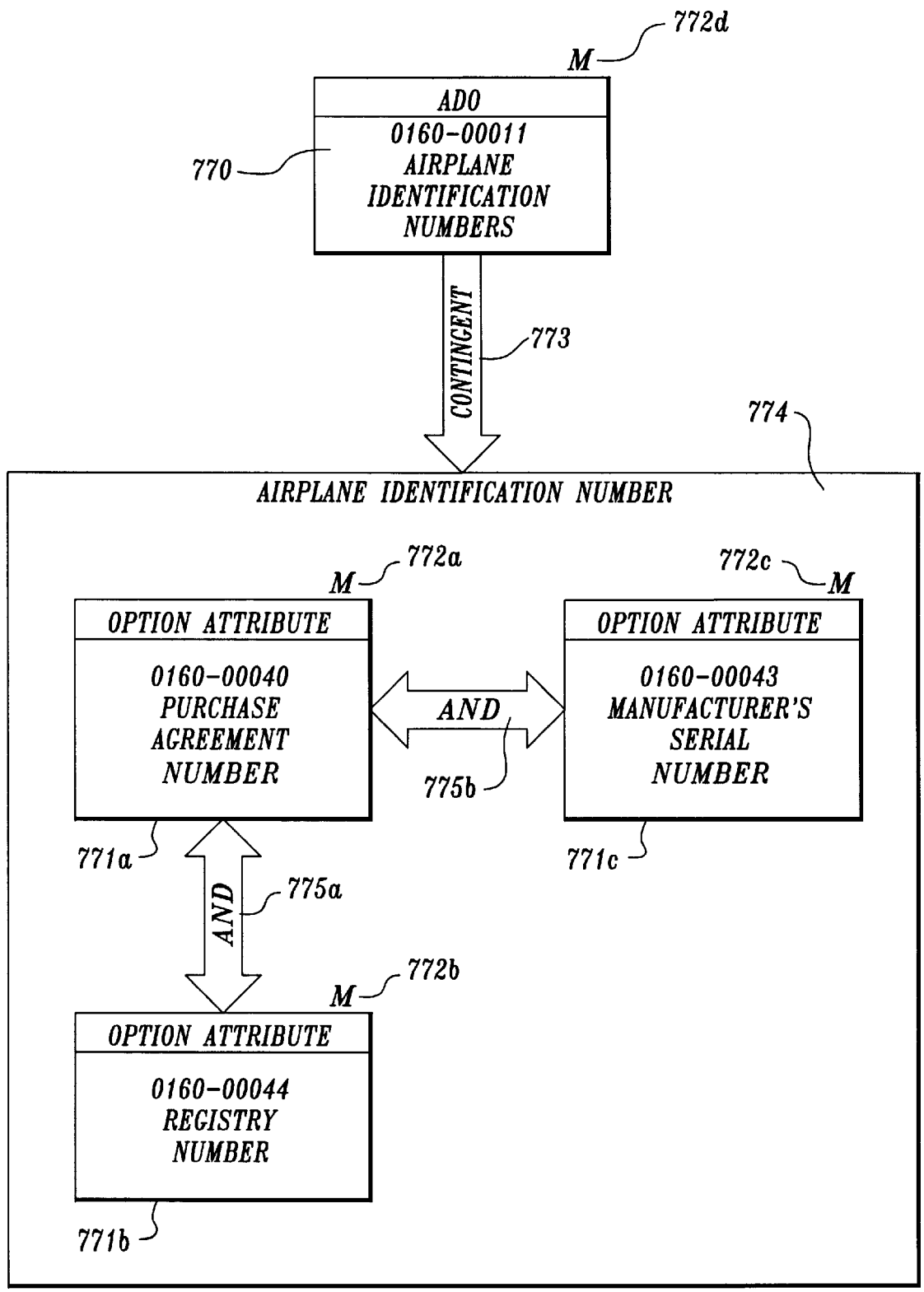

FIG. 7C illustrates an exemplary option-to-option Knowledge Map containing an attribute driven option (ADO) 770 and three option attributes 771a, 771b and 771c. The ADO 770 includes an indicator 772d, depicted as an "M," representing the information that the ADO is mandatory. A mandatory option is an option that is required to be selected in order to complete the product configuration. As depicted in FIG. 7C, the ADO 770 representing airplane identification numbers is a mandatory option.

A contingent relationship 773, graphically represented as an arrow with a pointer at one end, represents the information that the ADO 770 is contingent upon the selection of options within a group box 774. The group box 774 contains the three option attributes 771a, 771b and 771c. The option attributes 771a, 771b and 771c are linked to each other by conjunctive relationship operators 775a and 775b, indicating that a selection within the group box 774 requires a selection of all three option attributes 771a, 771b and 771c. As depicted by the indicators 772a, 772b and 772c, the three option attributes 771a, 771b and 771c are mandatory. The portion of the Knowledge Map depicted in FIG. 7C represents the information that a complete commercial airplane product requires the selection of the ADO 770 representing airplane identification numbers. The selection of the airplane identification numbers is contingent on the selection of three components of the airplane identification numbers represented by the option attributes 771a, 771b and 771c, namely a purchase agreement number, a registry number and a manufacturers serial number. A contingent relationship 773 can have a text explanation associated with it (not shown) that explains the reason for the contingency.

Figure 7D:
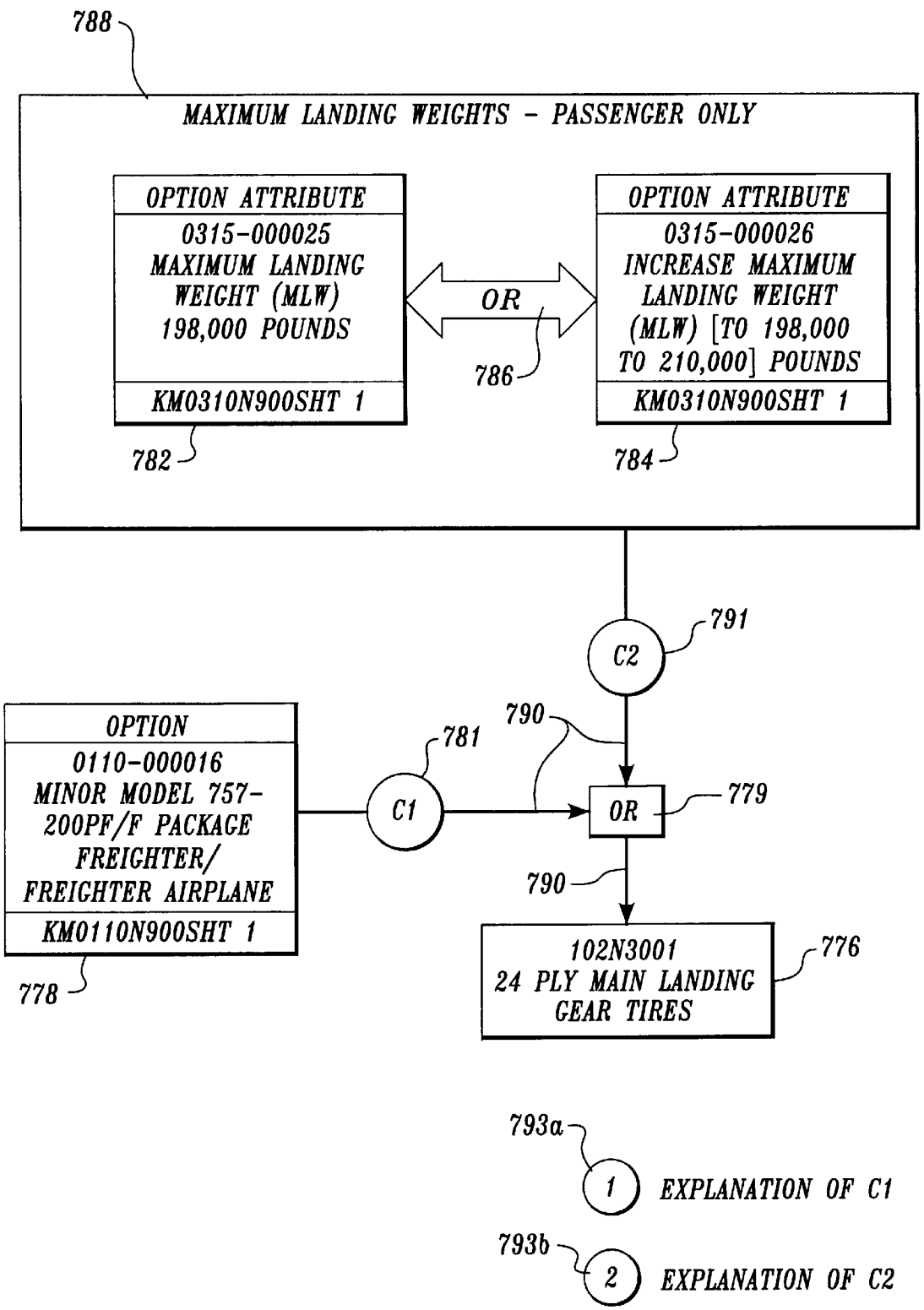

FIG. 7D illustrates a portion of an exemplary option-to-module Knowledge Map formed in accordance with the invention. A "24-ply tires" independent module 776 is connected by an option-module relationship 790 to a "minor model" option 778 and a "maximum landing weights" group box 788. The option-module relationship 790 is modified by a conjunction box, specifically an OR box 779. The Knowledge Map depicted in FIG. 7D designates the information that if the "minor model" option 778 is selected, or if the "maximum landing weights" group box 788 is selected, the "24-ply tires" module 776 must be included in the product. A relationship identifier 781 between the OR box 779 and the "minor model" option 778 corresponds to text 793a that explains the reason for the requirement with regard to the "minor model" option 778. A second relationship identifier 791, corresponding to text 793b, explains the reason for the requirement with respect to the group box 788.

Within the group box 788, two options 782 and 784 are linked by a disjunctive relationship 786. This portion of the Knowledge Map represents the information that if either one of the options 782 or 784 are selected, then the independent module 776 must be included in the production of the product. The module 776 is considered to be independent because its inclusion in the final product is required if exactly one associated option (782, 784, or 778) is selected. As depicted, the relationship identifiers 781 and 791 are different, and therefore have different corresponding text explanations 793a and 793b. In accordance to constraints explained in further detail below, it is possible for two or more relationship identifiers 781 and 791 to have the same associated explanatory text 793.

The disjunctive relationship 786 specifies a relationship between the "maximum landing weight" option 782 and the "increase maximum landing weight" option 784. Specifically, the disjunctive relationship 786 indicates that, in order to select the "maximum landing weights" group box 788, only one of the options 782 or 784 must be selected. Both options 782 and 784 may not be selected at the same time. Contrasted with this relationship, the OR box 779 does not specify a relationship between the "minor model" option 778 and the "maximum landing weights" group box 788. It is valid for a product configuration to include the selection of both the "minor model" option 778 and the "maximum landing weights" group box 788. The OR box 779 modifies the option-module relationship 790, but indicates no relationship between options or group boxes.

Figure 7E:
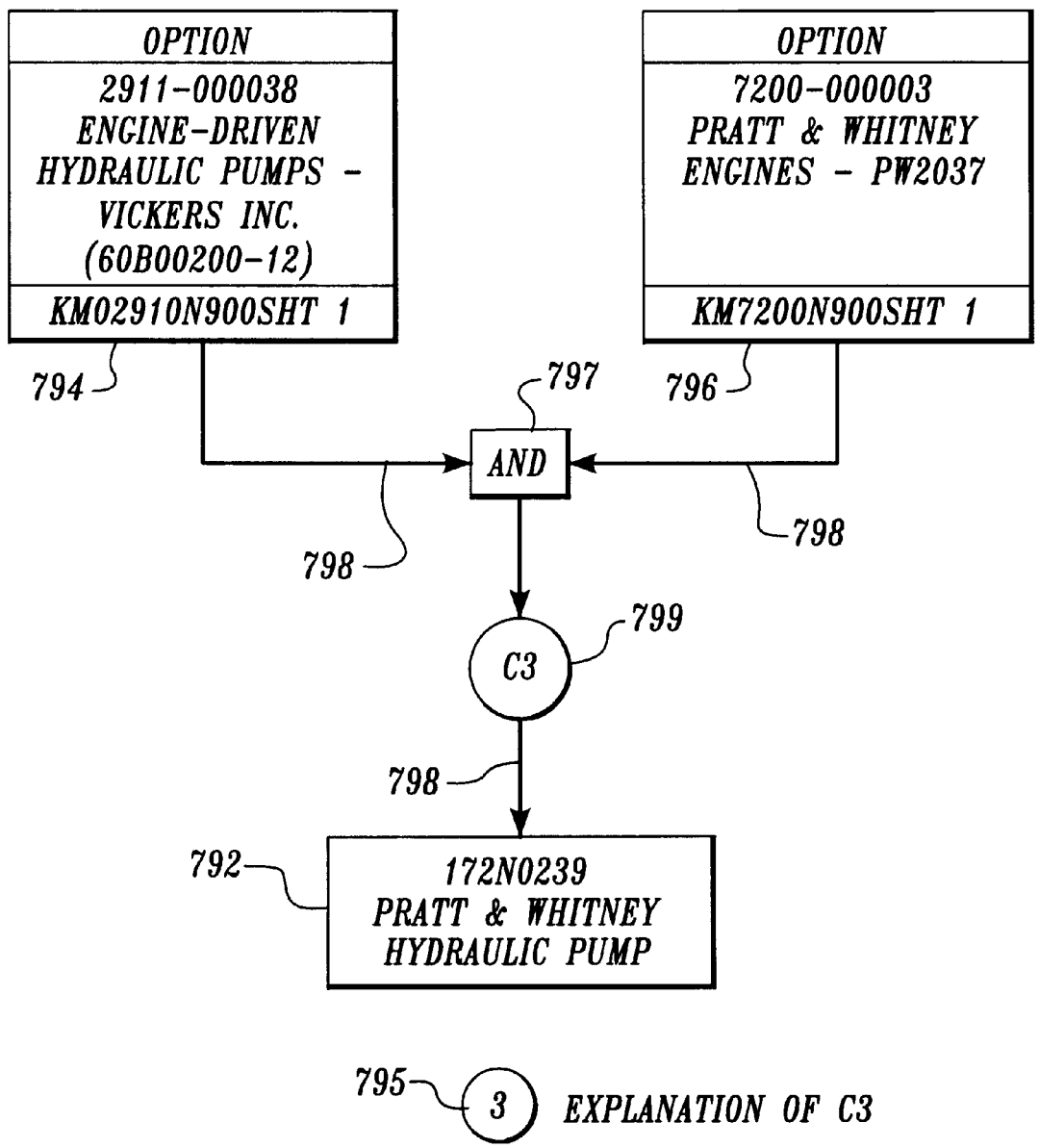

FIG. 7E illustrates a portion of an exemplary option-to-module Knowledge Map including a dependent module 792, representing a "Pratt and Whitney hydraulic pump," that is associated with two options: An "engine-driven hydraulic pump" option 794 and a "Pratt and Whitney engines" option 796. The options 794 and 796 are linked to the dependent module 792 by an option-module relationship 798 that is modified by an AND box 797.

As depicted, the option-module relationship 798 together with the AND box 797 indicates that if the options 794 and 796 are both selected, then the dependent module 792 must be included in the production of the final product. If only one of the options 794 or 796 is selected, then the dependent module 792 is not included in the production of the final product. Only the selection of both options 794 and 796 creates the requirement that the dependent module 792 be included in the product. Unlike the conjunctive relationships 775a–b in FIG. 7C, the AND box 797 does not create a relationship between the options 794 and 796 it connects. It is valid for only one of the connected options 794 or 796 to be selected without the selection of the other option. The module 792 is considered to be a dependent module because its inclusion in the final product is required only if more than one associated options are selected. As depicted, the option-module relationship 798 includes a relationship identifier 799 having a corresponding explanatory text 795. As depicted in FIG. 7E, when a relationship identifier describes the relationship between a module and each of the options connected by an option-to-module relationship 798, the relationship identifier 799 can be positioned between the logical modifier and the module. This is contrasted with the use of two relationship identifiers 781 and 791 (FIG. 7D) positioned between the logical modifier and the option or group box corresponding to the relationship identifier, where the corresponding explanatory texts 793a–b differ.

Figure 8:
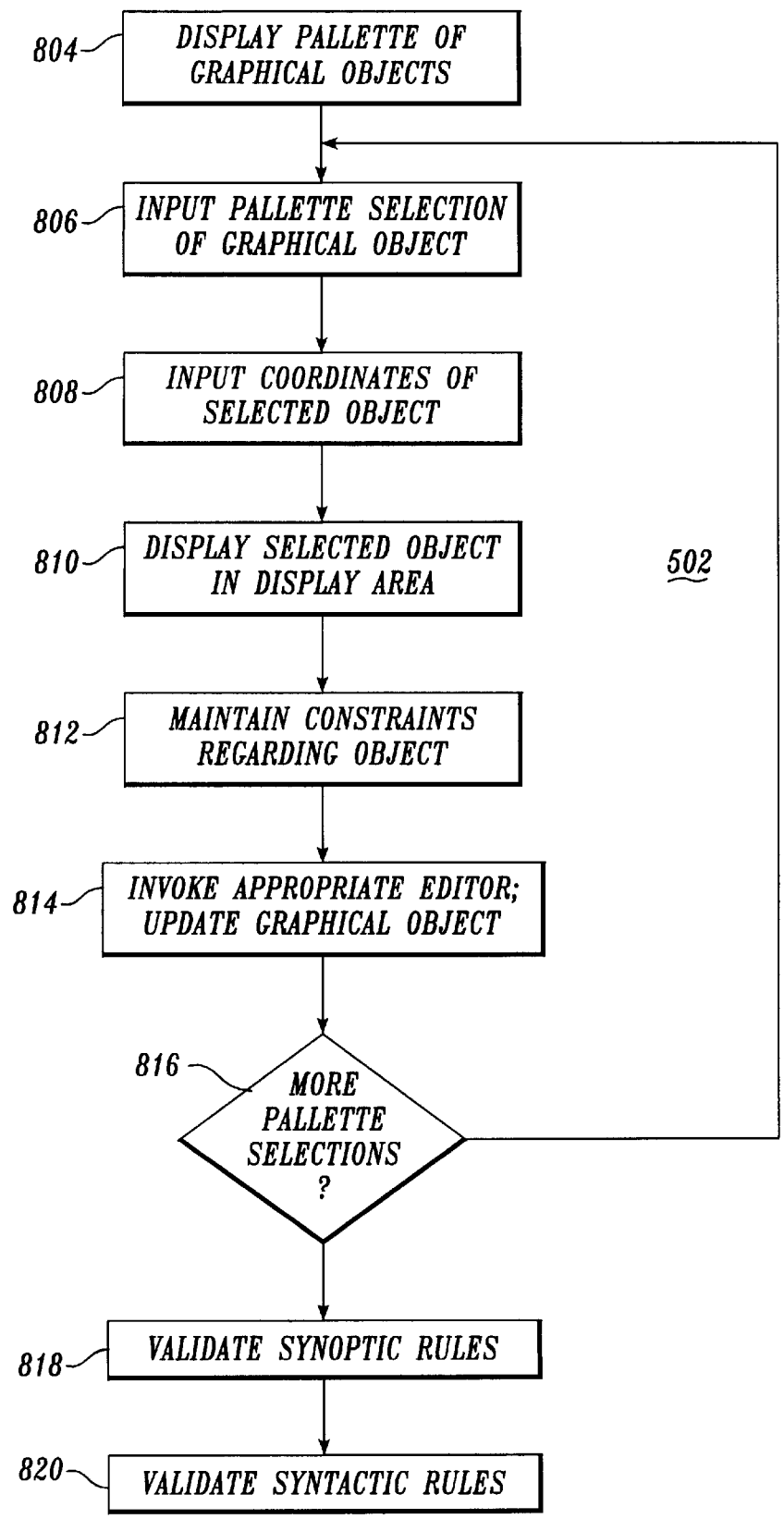
FIG. 8 is a flow diagram illustrating the process of creating a graphical object.

FIG. 8 is a flow diagram illustrating the process 802 of creating and editing graphical objects in accordance with the invention. At step 804, a palette 414 (FIGS. 1 and 3) containing iconic representations of graphical objects 15 is displayed. When an operator (i.e., a user) selects one of the graphical objects represented on the palette, at step 806, the operator's selection is input. The operator then indicates a position in the display workspace 412 (FIGS. 1 and 3) where the graphical object is to be located. At box 808, the coordinate positions of the selected object are input. In one actual embodiment of the invention, the specification of a position on the display workspace 412 is performed by clicking a button on a mouse when the cursor is above the graphical object selected from the palette, moving the cursor to the precise coordinates in the display workspace 412 by dragging the mouse, and releasing the mouse button at the desired position. As a result of the input selection of a graphical object (step 806) and the input of the selected object's coordinates (step 808), at step 810, a representation of the graphical object is displayed in the display area 412. As will be readily understood by one skilled in this art, and others, a number of different means of specifying coordinate positions on a display space exist that are functional for placing a graphical object on a display space. Thus, description of using a mouse to select and drag an iconic representation of a graphical object should be considered exemplary, and not limiting.

Once the graphical object 504 is displayed, at step 812, the computer program 404 maintains constraints regarding the graphical object. These include constraints such as limiting the manipulation of the graphical object by the operator. For example, when the graphical object 504 is displayed, predetermined sizes are employed. A graphical product object 508 has a predetermined length along the x axis, and a predetermined height along the y axis. The constraint engine 422 (FIG. 4) prevents an operator from modifying the ratio of the graphical product object 508 length to its height, the length of the graphical product object, or the height of the graphical product object 508. In addition, a graphical product object 508, as illustrated in FIGS. 7A–7E, includes at least two graphical elements, each of the graphical elements having a predetermined length and height. The constraint engine 422 prevents an operator from separating the graphical elements of a graphical product object 508, removing a graphical element from a graphical product object, or modifying the size of any element of a graphical product object. These constraints operate to maintain predefined visual standards pertaining to a Knowledge Map, and thereby improve their ability to convey information. The constraint engine 422 also prevents an operator from directly modifying the text within any graphical object 504. An operator can only modify the text within a graphical object by the use of the editors 416, as described below. The constraint engine 422 prevents an operator from directly modifying, deleting, or adding text to a graphical object. The constraints are discussed in further detail below.

At step 814, an editor 416 corresponding to the type of graphical object is invoked. In one actual embodiment, the editor is invoked in response to an operator double clicking on the mouse button when a cursor is over a graphical object. Alternatively, an editor can be invoked as a result of a command selection from a menu, or as a result of a keyboard command. Details of the functioning of the editors 416 are explained below. After the editing is completed, the corresponding graphical object is updated. At step 816, a test is made to determine whether the operator has made another palette selection. If another palette selection is made, flow returns back to box 806. If no more palette selections are made, at step 818, a validation of synoptic rules is performed. At step 820, a validation of syntactic rules is performed. Explanations of the syntactic rules and semantic rules are provided below.

Figure 9:
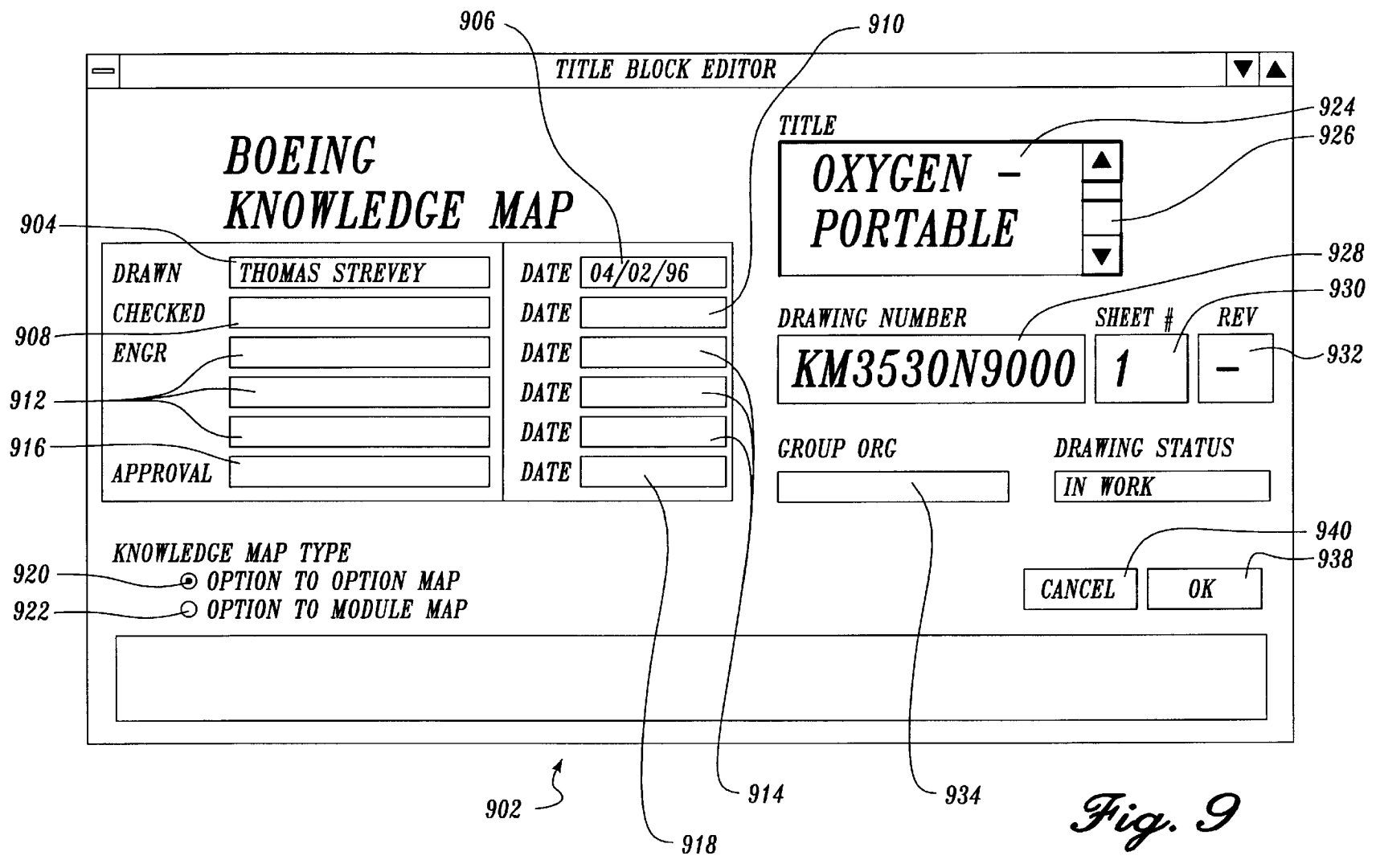

FIG. 9 illustrates a title block editor 902, which interfaces with an operator to allow entering or modification of title block 506 information. In a conventional manner when a cursor is moved to one of the hereinafter described boxes, the operator is allowed to enter information into, or edit previously entered information in the box. An edit box 904 accepts input from the keyboard, specifically input that specifies an author's name. A corresponding edit box 906 accepts the date of the drawing as input. Edit box 908 receives input of the name of a person who checked the accuracy of the drawing. A corresponding box 910 receives input of the corresponding date. Edit boxes 912 accept input of engineers' names, and corresponding edit boxes 914 accept input of the corresponding dates. Edit box 916 accepts input of the name of a person who approved the Knowledge Map. Edit box 918 accepts input of the corresponding date of approval.

A pair of radio buttons 920, 922 allows an operator to select the Knowledge Map type. A radio button 920 represents an option-to-option map selection, and a radio button 922 selects an option-to-module map. While one button must be selected, the radio buttons 920, 922 are coordinated, so that only one of the pair can be selected. An edit box 924, which includes a vertical scroll bar 926, accepts input of the title of the Knowledge Map.

An edit box 928 accepts input of a drawing number. In accordance with the invention, the computer program verifies that the drawing number entered by an operator matches a predetermined format. In one actual embodiment of the invention, for example, the format of the drawing number is "KMXXXXYZZZZ," where:

XXXX represents a four-digit number;

Y represents a letter indicative of a product model; and

ZZZZ represents a four-digit serial number.

In this actual embodiment, the first two letters of the drawing number must be "KM." When an operator, by selecting an "OK" button 938, requests that the computer program 404 accept all the information entered in the title block editor, the program 404 automatically verifies that the drawing number is syntactically correct. If the drawing number entered is incorrect or missing, an error message (not shown) is displayed indicating that the drawing number is invalid.

An edit box 930 accepts input of a sheet number. An edit box 932 accepts a revision number. An edit box 934 accepts input of a group organization. A drop-down list box 936 allows the selection of a drawing status from a list of predetermined status options. The "OK" button 938 accepts entry of the information entered in the title block editor 902. A "cancel" button 940 cancels the information that was entered by the operator during the current session of the title block editor. Finally, a help message box 942 displays messages to assist the operator in completing the title block editor. Preferably, when the cursor is moved over one of the controls, corresponding informational text is displayed in the help message box 942.

Figure 10:
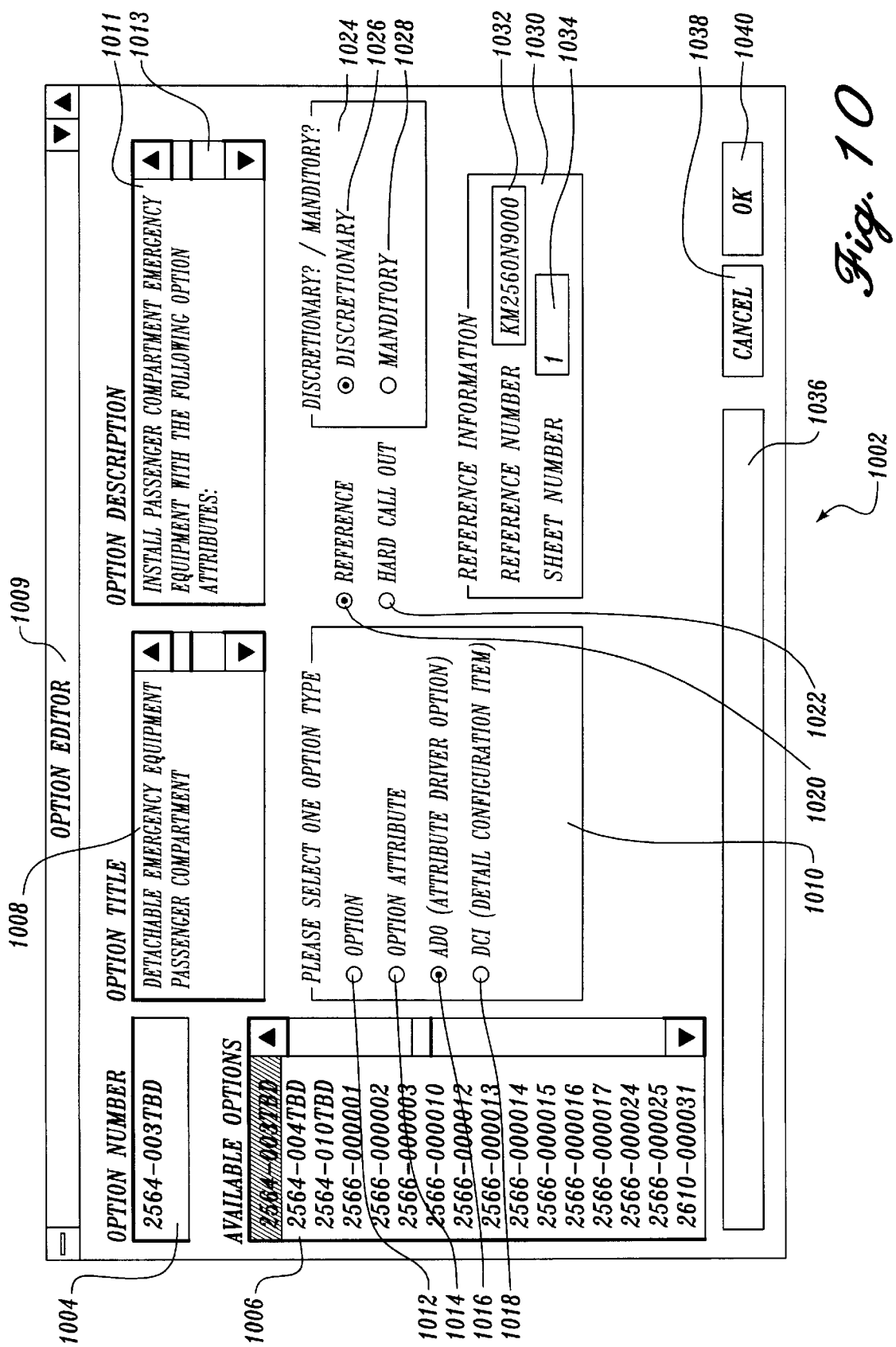
FIG. 10 is a pictorial representation of an option editor window.

FIG. 10 illustrates an exemplary option editor window 1002, for editing the attributes of an option 510. An edit box 1004 accepts input of an option number. The option number is a number that uniquely identifies the option, and corresponds to option information stored in a database 420 (FIG. 4), discussed in more detail below. The edit box 1004 operates in conjunction with a list box 1006, which lists all of the available option numbers. The list box 1006 is populated after retrieving a list of available options from the database. When an operator selects an available option in the option list box 1006, the option number is automatically inserted in the option edit box 1004. Alternatively, the operator can directly enter an option number in the option edit box 1004. Each available option has a corresponding option title and description stored in the database. When an available option is selected, the corresponding option title is automatically displayed in an option title edit box 1008, and the option description is displayed in an option description edit box 1011. Preferably, the option title edit box 1008 and the option description edit box 1011 include scroll bars 1009 and 1013, respectively, for vertical scrolling.

As discussed above, an option can be one of four option types: an option attribute, an attribute driven option (ADO), an option specified as a default configuration item, or an option that is none of these types. The option type selection box 1010 contains four radio buttons corresponding to the four option types. Radio button 1014 corresponds to an option attribute type. Radio button 1016 corresponds to an attribute driven option (ADO). Radio button 1018 corresponds to a default configuration item (DCI). Radio button 1012 corresponds to an option that is not an option attribute, an ADO or a DCI. One of these radio buttons must be selected, and only one can be selected at a time.

Radio buttons 1020 and 1022 are used to indicate whether the option is a reference option (button 1020), or a hard called-out option (button 1022). A selection box 1024 is used to indicate whether the option is discretionary or mandatory. A radio button 1026 corresponds to a discretionary option, and a radio button 1028 corresponds to a mandatory option, as explained above with reference to FIG. 7C.

A reference information block 1030 displays information pertaining to reference options. When a reference option is specified, the corresponding reference number is displayed in a display box 1032, and the corresponding sheet number is displayed in a display box 1034. The reference number and sheet number are retrieved for the specified option number from the database and automatically displayed in the reference information block 1030.

A help box 1036 near the bottom of the option editor window 1002 automatically displays information describing each of the controls in the option editor. When the cursor is moved over one of the controls, corresponding informational text is displayed in the help information box 1036.

A "Cancel" button 1038 is used by an operator to cancel all entries and changes made during the current invocation of the option editor. An "OK" button 1040 is used to accept all edits and changes that have been made. After an operator selects the OK button 1040, the computer program 404 automatically updates the corresponding graphical option object 510 in accordance with the specifications entered in the option editor 1002.

Figure 11:
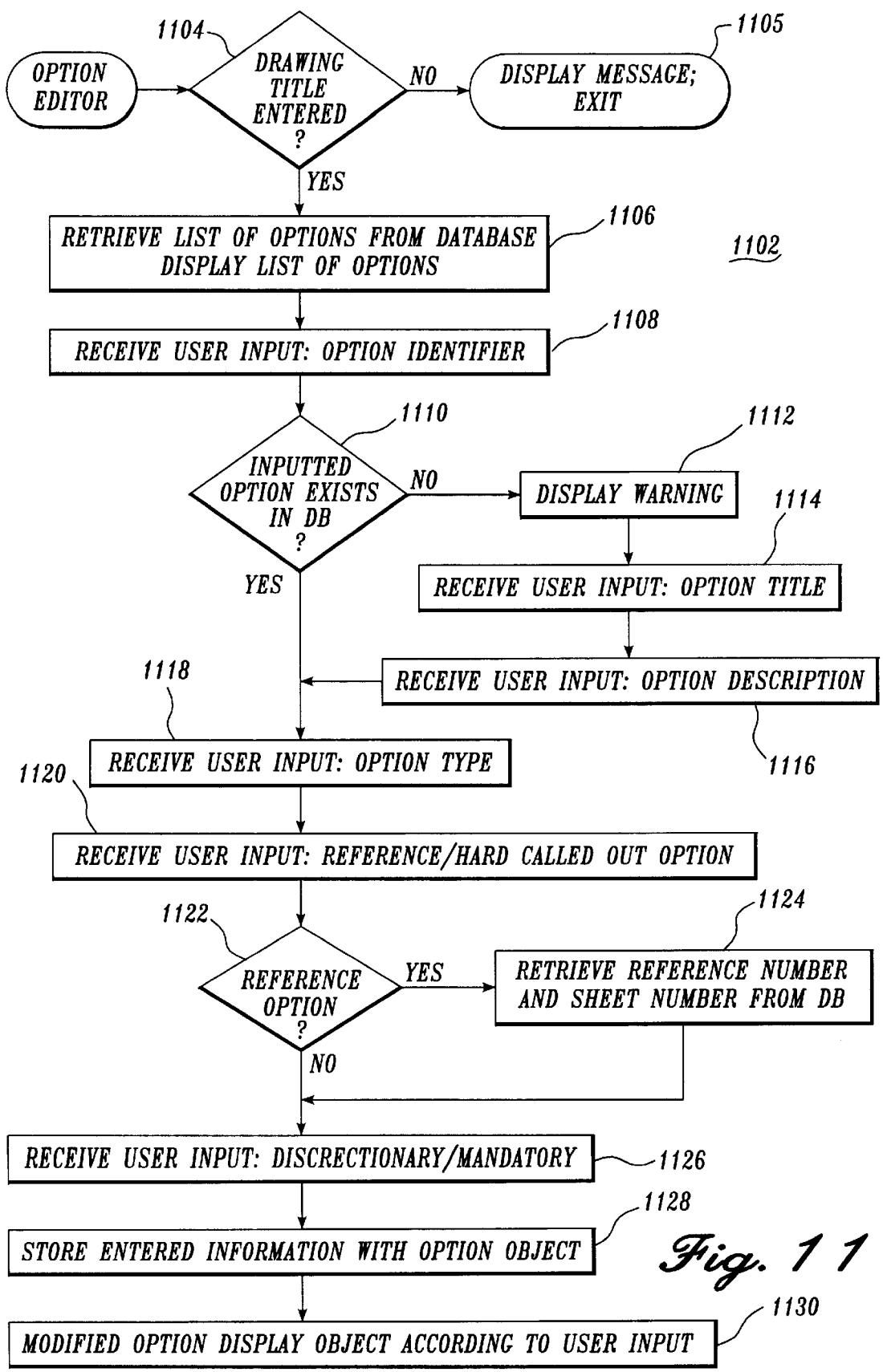
FIG. 11 is a flow diagram of the process of editing information pertaining to a graphical option object.

FIG. 11 illustrates the process 1102 of entering and modifying information in the option editor 1002. The computer program, in accordance with the invention, prevents the invocation of the option editor until a drawing title has been entered, as discussed above with reference to the title block editor 902 (FIG. 9). Thus, upon invocation of the option editor (box 814 of FIG. 8), a test is made, at step 1104, to determine whether a drawing title has been entered. If a title has not been entered, at step 1105, an appropriate message is displayed, and the option editor exits. If a title has been entered, the process proceeds to step 1106, where a list of options is retrieved from the database 420 (FIG. 4) and displayed in the available option list box 1006. At step 1108, the program receives input from the operator specifying the option number or identifier, as discussed above. If an option number is entered directly in the option number edit box 1004, rather than being selected from the available option list box 1006, a test is made at step 1110 to determine whether the entered option exists in the database 420. If the option does not exist in the database, at step 1112 a warning is displayed to the operator. At step 1114, the program accepts operator input of the option title in the option title edit box 1008. At step 1116, the program accepts operator input of the option description in the option description edit box 1011.

At step 1118, the program accepts operator input of the option type, in the option type selection box 1010. At step 1120, the program accepts operator input of whether the option is a reference option (button 1020), or a hard called-out option (button 1022). At step 1122, a test is made of whether reference option has been selected. If reference option has been selected, at step 1124, the reference number and sheet number corresponding to the selected option number is retrieved from the database and displayed in the reference number display box 1032 and the sheet number display box 1034, respectively.

At step 1126, the program receives operator input, in the discretionary/mandatory box 1024, of whether the option is discretionary or mandatory. When the operator selects the OK button 1040, at box 1128, the information entered in the option editor is stored in the database 420 with references to the corresponding option object 510. At step 1130, the option object is modified according to the input information. As will be apparent to one skilled in this art, and others, the specific controls used in the option editor 1002, and the steps described in the process 1102 of entering information in the option editor can be modified while remaining within the scope of the invention. The display of the option editor 1002 and the corresponding process 1102 should be considered exemplary, and not limiting.

Figure 12:
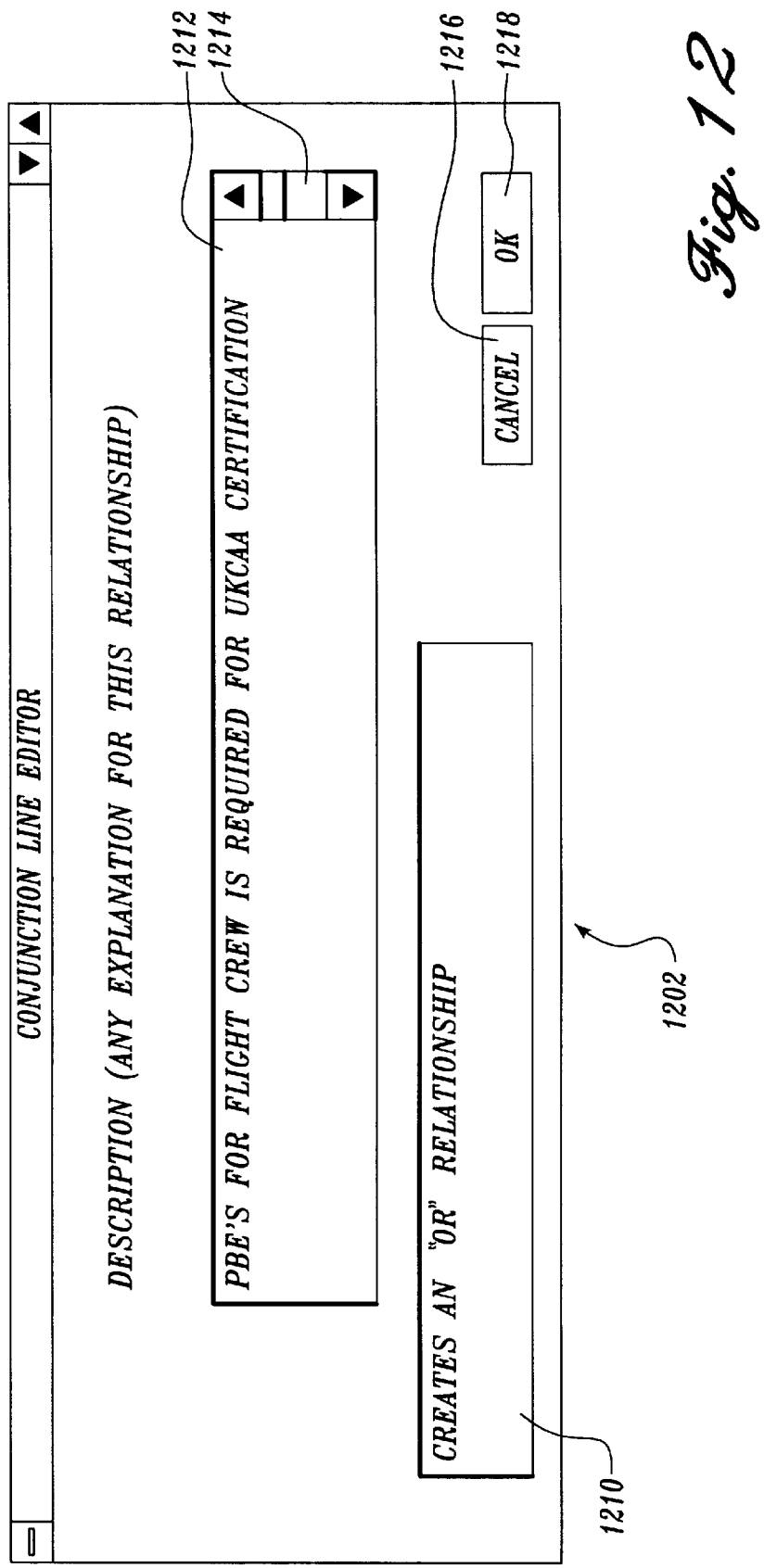
FIG. 12 is a pictorial representation of a relationship object editor window.

FIG. 12 illustrates an exemplary logical relationship editor window 1202, operative for displaying information and allowing editing of information pertaining to a logical relationship object 544 (FIG. 5). The logical relationship editor window 1202 is displayed when a logical relationship object 544 has been created, and its editor invoked (box 814 of FIG. 8). As illustrated in FIG. 6, a Knowledge Map palette 414 includes two icons representing logical relationship objects. One icon 614 represents a conjunctive relationship object 546 and one icon 616 represents a disjunctive relationship object 548 (FIG. 5). Invocation of the corresponding editor for either graphical object displays the logical relationship editor window 1202. The type of logical relationship object 544 is displayed in the title 1204 of the editor window. The logical relationship editor 1202 depicted in FIG. 12 corresponds to a conjunctive relationship object 548. A help box 1210 displays text that explains the functioning of the controls within the editor window 1202, when the cursor is positioned over one of them. A description edit box 1212 allows an operator to enter text that explains the relationship represented by the logical relationship object 544. Preferably, the description edit box 1212 includes a vertical scroll bar 1214.

The logical relationship editor further includes a "Cancel" button 1216 and an OK button 1218 operative for canceling the current edits in the logical relationship editor, or for accepting the current edits, respectively. A logical relationship editor for entering information pertaining to a disjunctive relationship object is similar to the editor depicted in FIG. 12, except that the title indicates the disjunctive relationship.

Figure 13:
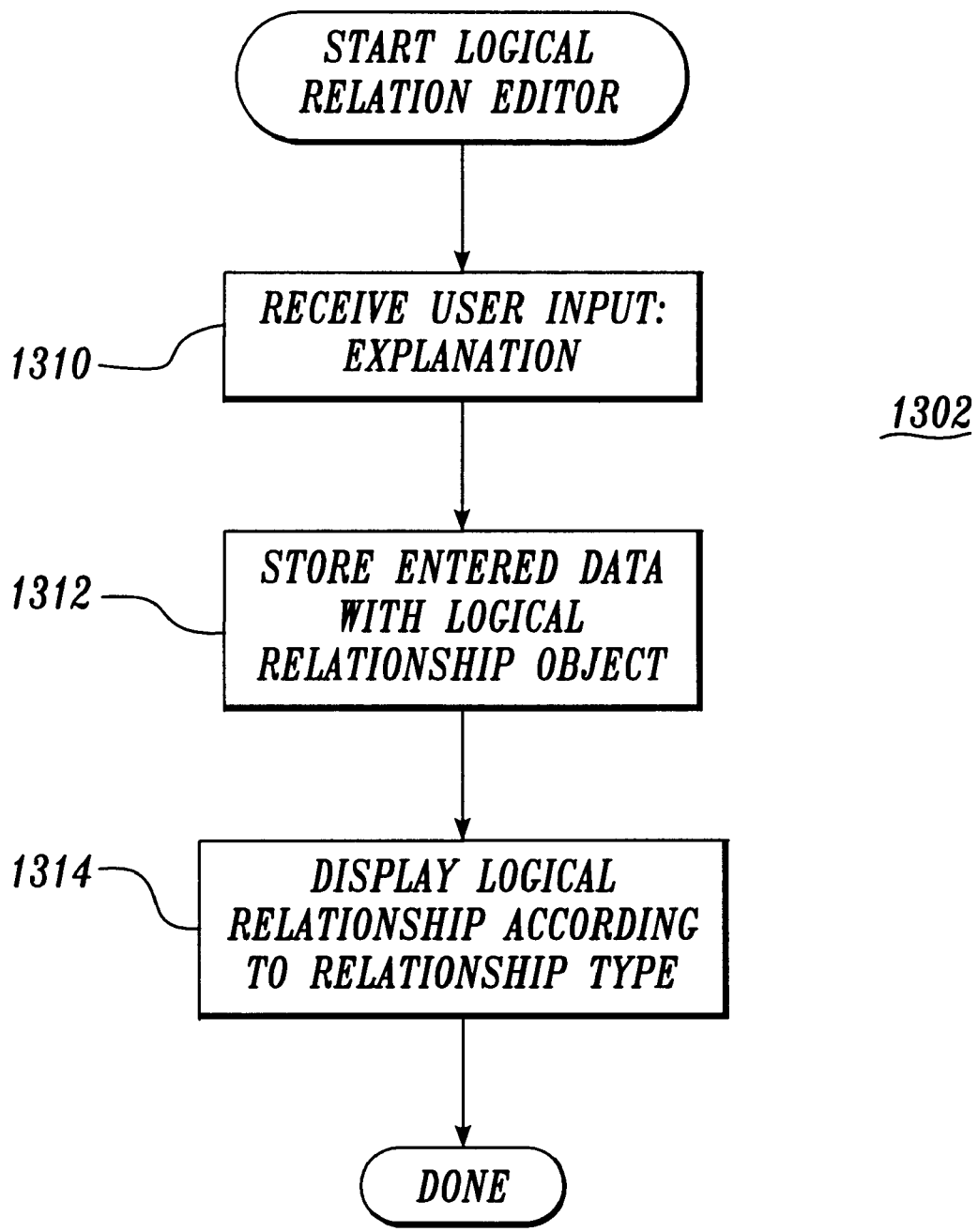
FIG. 13 is a flow diagram illustrating the process of editing information pertaining to a graphical relation object.

FIG. 13 illustrates the process 1302 of creating and editing a logical relationship object 544. As discussed above with regard to FIG. 8 (blocks 806 to 810), a logical relationship object is created and positioned in the display workspace 412 (FIG. 6). The logical relationship editor 1202 is then invoked (see 814, FIG. 8). At step 1310, a description of the relationship is input in description edit box 1212. At step 1312, the information entered by an operator is stored in the database and associated with the logical relationship object 544.

After the OK button 1218 is selected by the operator at step 1314, the relationship object editor window 1202 is closed, the associated logical relationship object 544 is displayed, and the corresponding description is stored.

Figure 14:
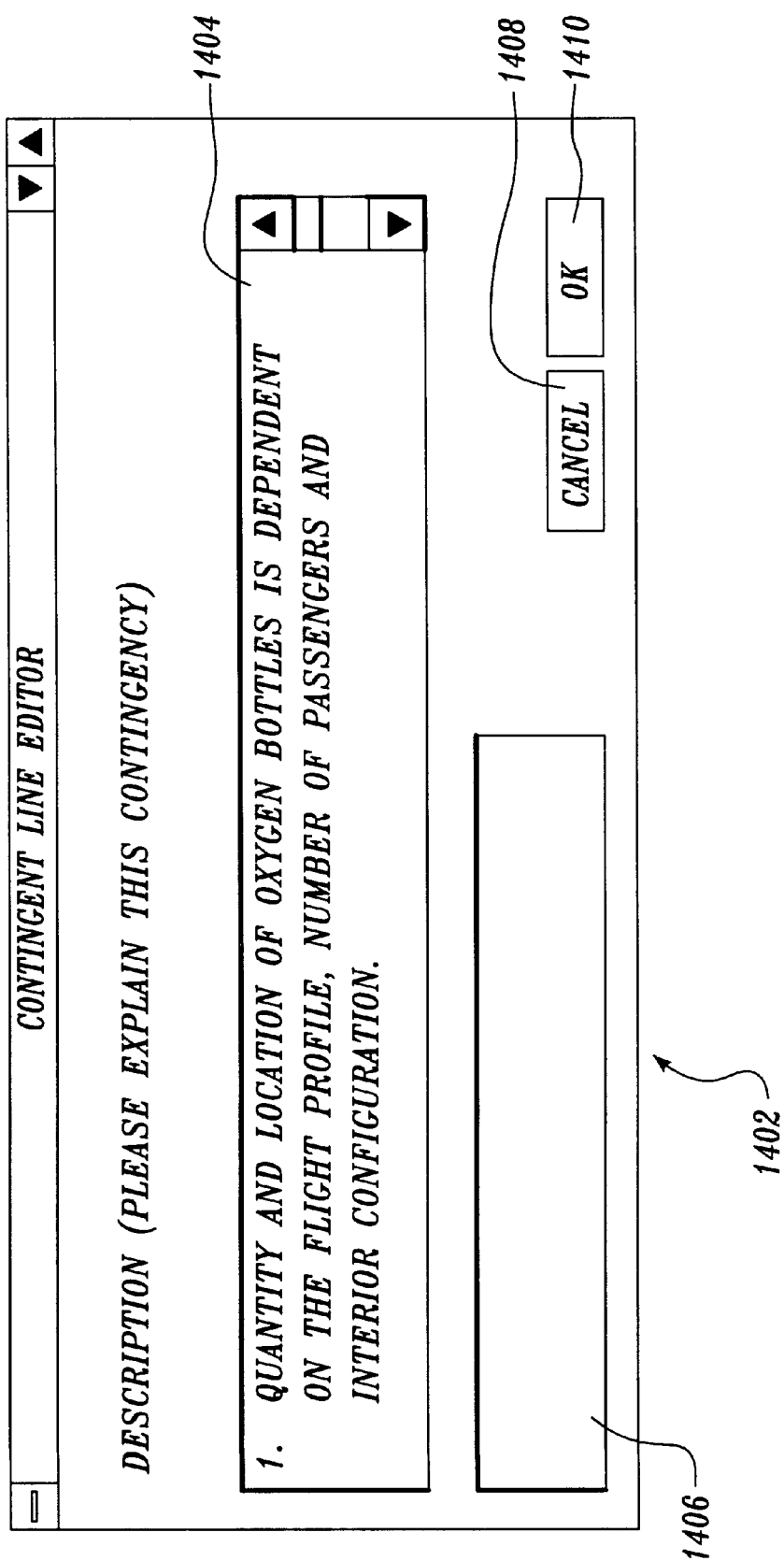
FIG. 14 is a pictorial representation of a contingent line editor window.

FIG. 14 illustrates a contingent line editor 1402, operative for editing information pertaining to a contingent relationship object 550 (FIG. 5). Description edit box 1404 accepts, from the operator, input of a contingent line number and associated explanation. A help box 1406 provides pertaining to the control on the contingent line editor over which the cursor is currently displayed. A "Cancel" button 1408 is operative for canceling the information entered during the current invocation of the contingent line editor 1402. An OK button 1410 is operative for entering the new information in the database associated with the currently selected contingent relationship object 550.

Figure 15:
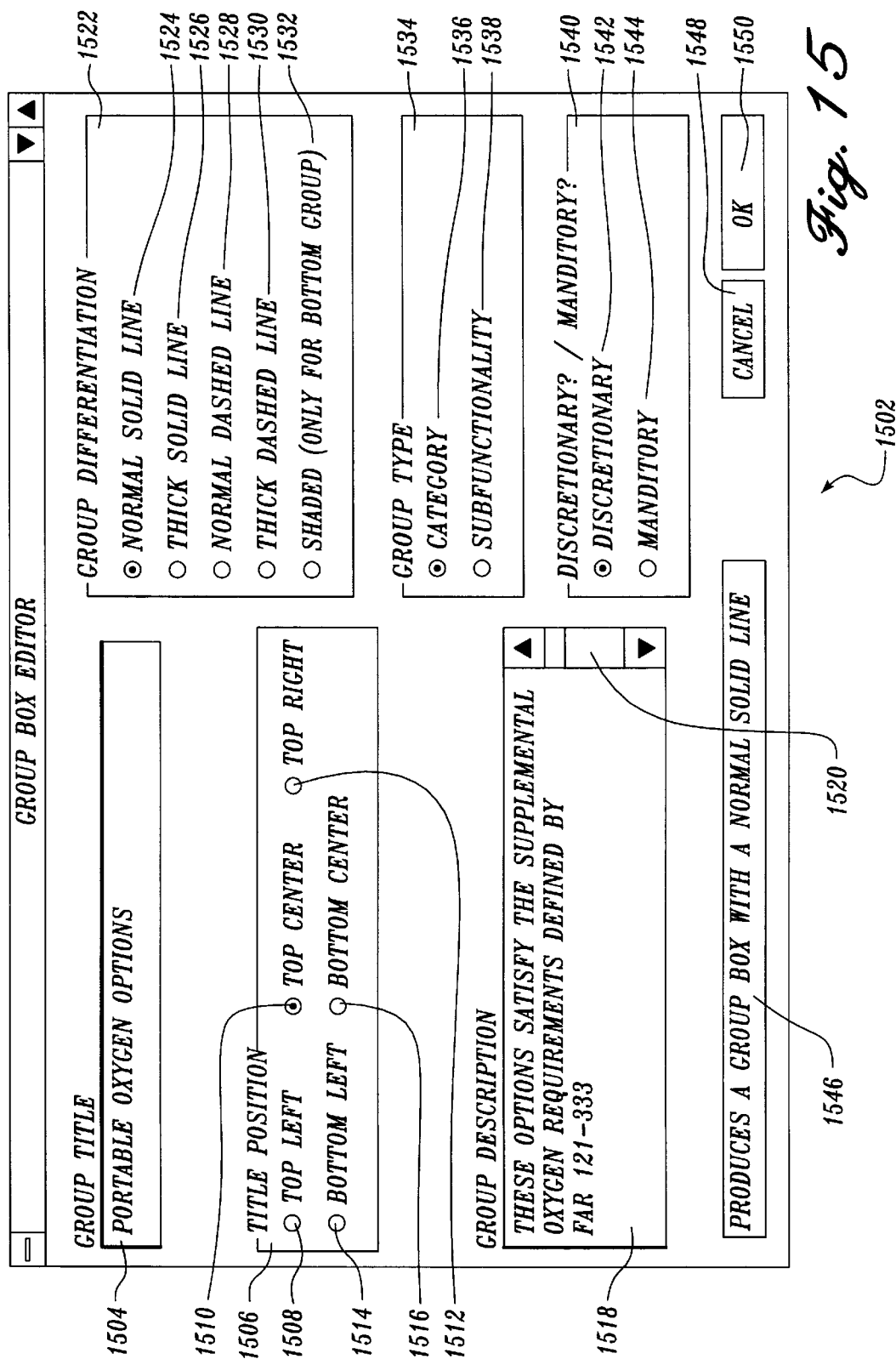
FIG. 15 is a pictorial diagram of a group box editor window.

FIG. 15 illustrates a group box editor window 1502, operative for modifying the characteristics of a group box object 542 (FIG. 5). A group title edit box 1504 accepts text describing the title of the group. The title position control area 1506 accepts input that instructs the program where to locate the group title. Five radio buttons provide five choices for the title position: a "top left" radio button 1508, a "top center" radio button 1510, a "top right" radio button 1512, a "bottom left" radio button 1514, and a "bottom center" radio button 1516 specify that the group title is to be positioned at the specified location. A group description edit box 1518, preferably having a scroll bar 1520 is operative for accepting input text that describes the group. A group differentiation control area 1522 provides a selection of the appearance of the group box 542. The radio buttons that are provided to allow selection of a group box appearance are as follows: "normal solid line" 1524, "thick solid line" 1526, "normal dash line" 1528, "thick dash line" 1530, and "shaded" 1532.

A group type control area 1534 provides a selection of one of two group types. A "category" radio button 1536 specifies that the group is at a top level grouping of option category. A "subfunctionality" radio button 1538 specifies that the group box is nested within a category group. The objects within a subfunctionality group share at least one attribute that is not shared by the other objects within the same category group.

A discretionary/mandatory control area 1540 provides a choice of whether the group box is discretionary or mandatory. A "discretionary" radio button 1542 is functional for indicating that the group box is discretionary. A "mandatory" radio button 1544 is functional for indicating that the group box is mandatory. As discussed above, a mandatory group box indicates that at least one option within the group box must be selected.

A help box 1546 displays text describing each of the controls within the group box editor window 1502, as the cursor is placed above each of the controls. A "Cancel" button 1548 is operative to cancel all the information entered during the current invocation of the group box editor window 1502. An OK button 1550 is operative to accept all input entered during the current invocation of the group box editor window 1502.

Figure 16:
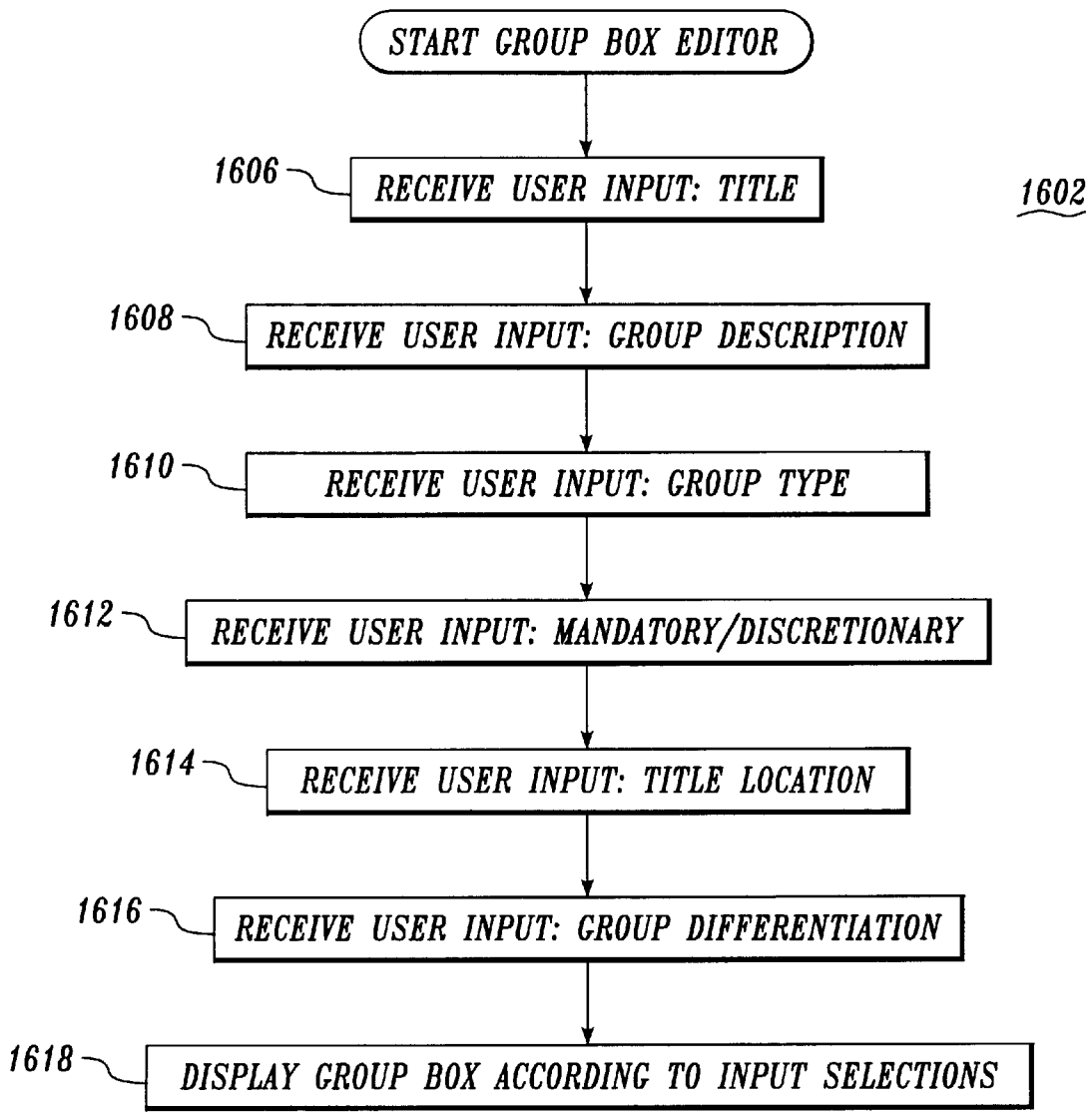
FIG. 16 is a flow diagram illustrating the process of editing information pertaining to a graphical group box object.

FIG. 16 illustrates the process 1602 of creating a group box and editing the characteristics of the group box. As discussed above with regard to FIG. 8 (blocks 806 to 810), the group box is created and positioned in the display workspace 412 (FIG. 1). The group box editor 1502 is then invoked. (See block 814, FIG. 8.) At step 1606, input is received in the group title edit box 1504. At step 1608, the textual input of the group description is received in the group description edit box 1518. At step 1610, the selection of a group type 1534 is received. At step 1612, the selection of whether the group box is discretionary or mandatory is received. At step 1614, a specification of the title position 1506 is received from the operator. At step 1616, the specification of the group differentiation characteristic, as entered in the group differentiation area 1522, is received. After receiving a selection of the OK button 1550, the group box editor 1502 is closed, and the associated group box object is modified and displayed according to the input selections, at step 1618.

Figure 17A:
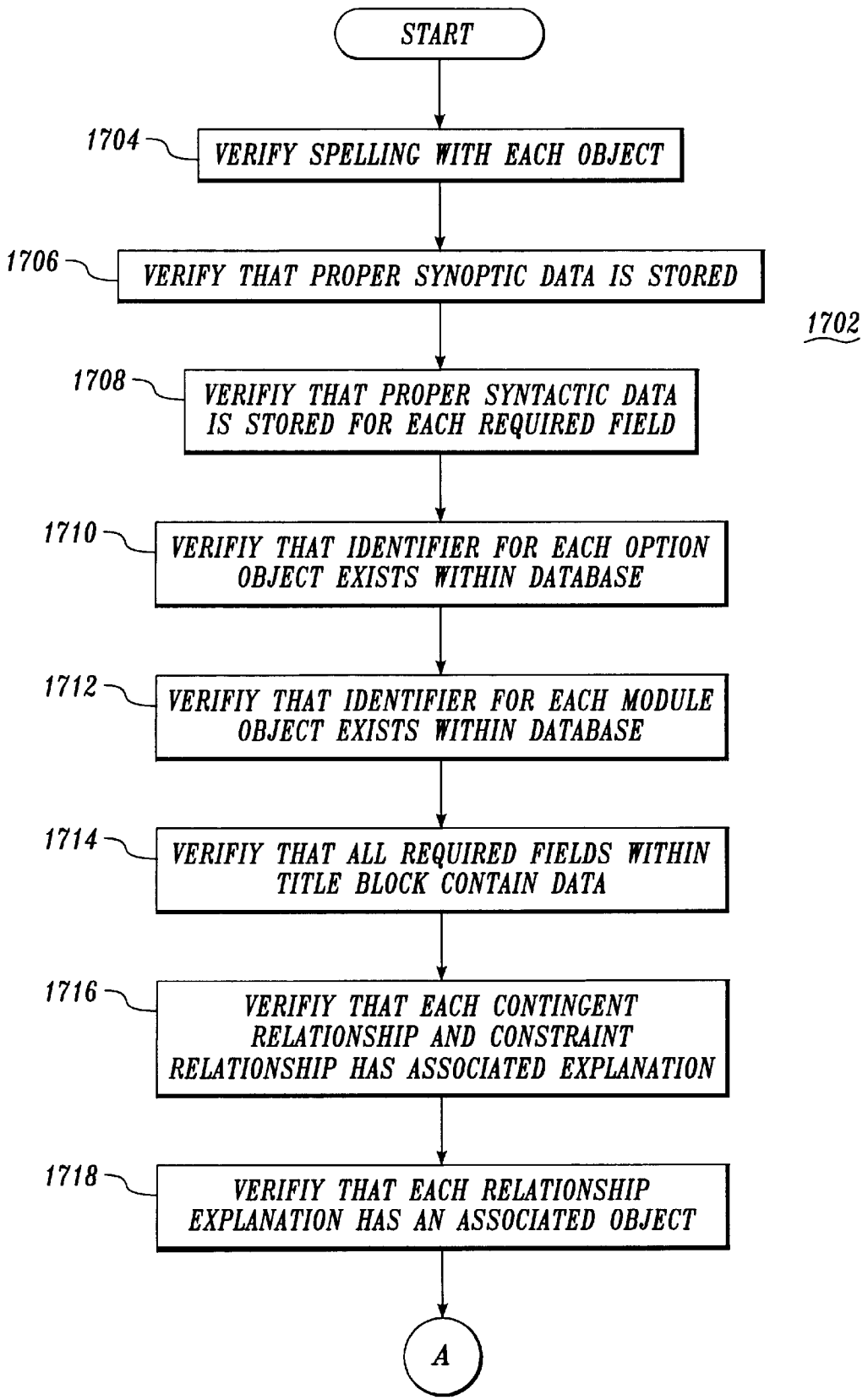
FIGS. 17A–17B are flow diagrams illustrating the verification of constraints pertaining to a Knowledge Map.
Figure 17B:
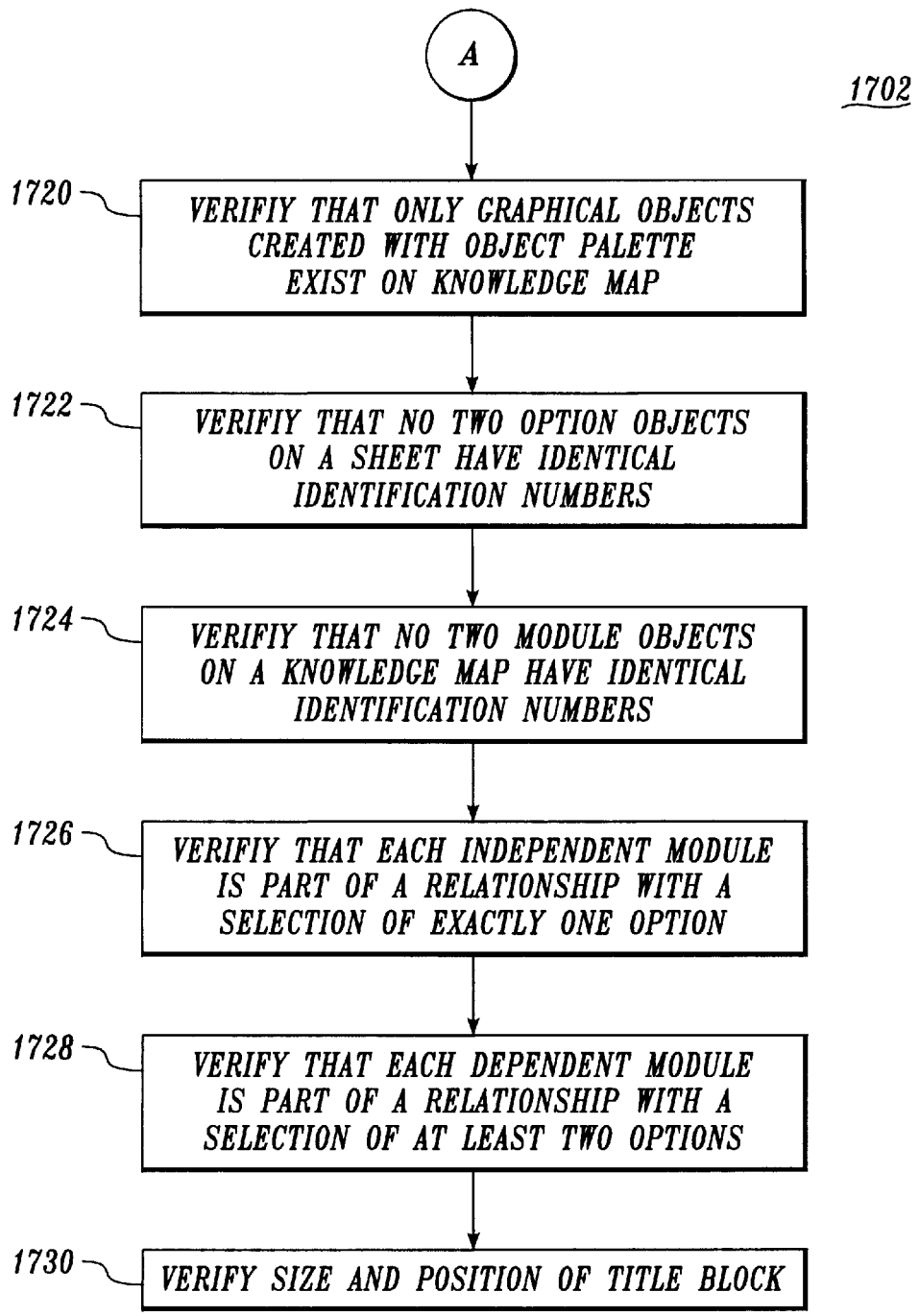

Prior to acceptance of a Knowledge Map, the constraint engine 422 (FIG. 4) performs a number of tests to verify that constraints are satisfied. FIGS. 17A and 17B illustrate the process 1702 of verifying that all constraints are satisfied. At step 1704, the spelling of the text within each object is verified for correctness. At step 1706, the constraint engine verifies that the proper synoptic data is stored with each object. Synoptic data refers to the data that specifies an object's position on a Knowledge Map and the object's relationship to other objects. These include location coordinates and relationship links.

At step 1708, the constraint engine 422 verifies that proper syntactic data is stored with each object. Syntactic data refers to the data for each field within an object. Specifically, the constraint engine verifies that all required fields have an associated value.

At step 1710, the constraint engine 422 verifies that the identifier corresponding to each option on the Knowledge Map exists within the option database. At step 1712, the constraint engine verifies that the identifier corresponding to each module 514 on the Knowledge Map exists within the module database. At step 1714, the constraint engine verifies that all required fields within the title block 506 contain data.

At step 1716, the constraint engine verifies that each contingent relationship 550 or constraint relationship 552 has an associated explanation. At step 1718, the constraint engine verifies that each relationship explanation has at least one associated contingent relationship 550, constraint relationship 552, or option-module relationship.

At step 1720, the constraint engine verifies that all graphical objects on the Knowledge Map have been created by the use of the Knowledge Map palette 414. At step 1722, the constraint engine verifies that no more than one option having identical identification numbers 710 exists on a Knowledge Map sheet. In other words, only one hard called-out option or one reference option corresponding to any identification number 720 may exist on a single Knowledge Map sheet. At step 1724, the constraint engine verifies that no more than one module having identical identification numbers can exist on one Knowledge Map.

At step 1726, the constraint engine verifies that each independent module 514 is part of a relationship with either one option or a group of options having conjunctive relationships between them. At step 1728, the constraint engine verifies that each dependent module 530 has a relationship with two or more option. At step 1730, the constraint engine verifies that the title block has a predetermined and fixed size and position, and that it has not been moved, deleted, or resized.

Figure 18A:
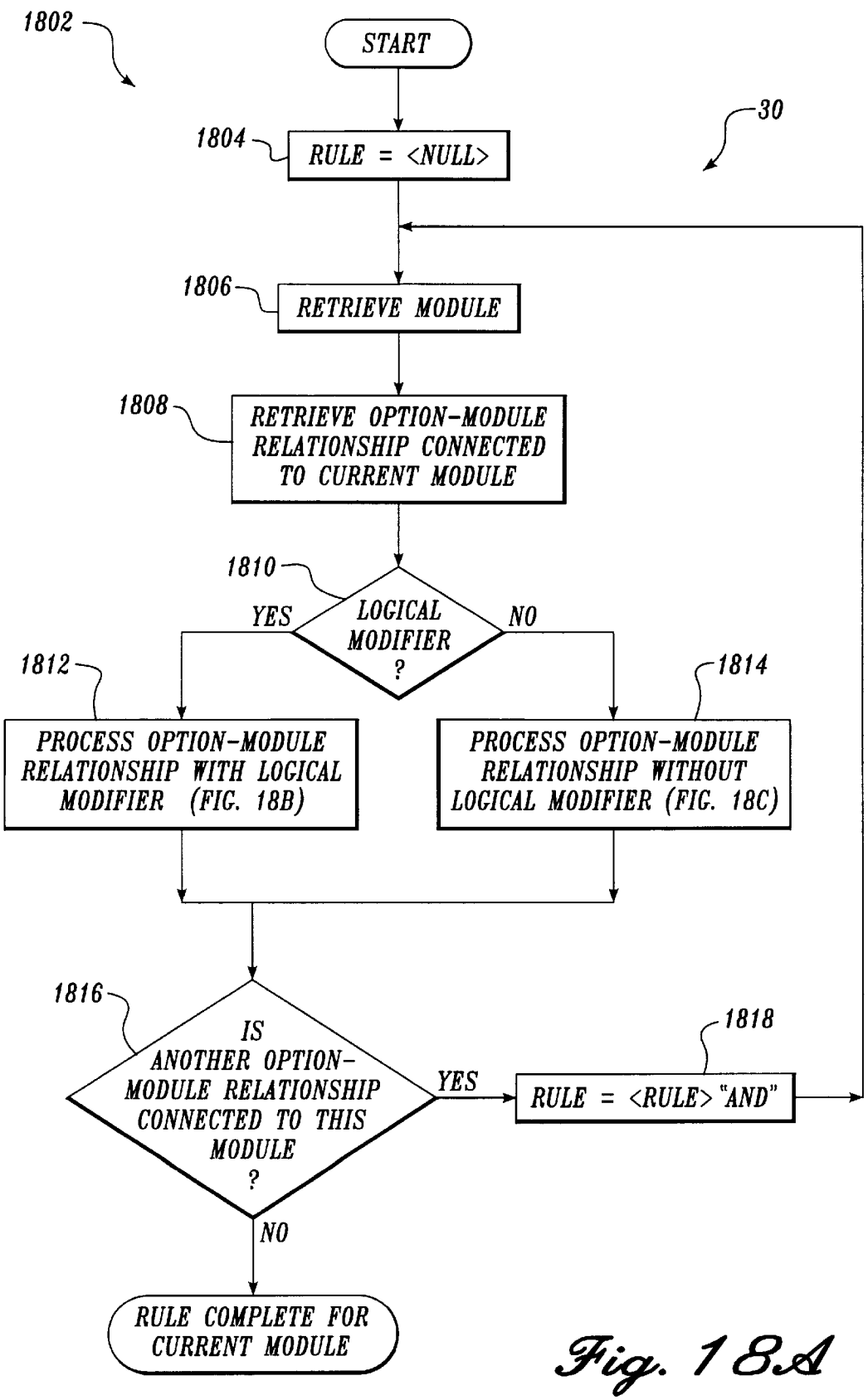
FIGS. 18A–18C are flow diagrams illustrating the process of retrieving rules-based information and generating a set of rules.

After a Knowledge Map is created and displayed, in accordance with the invention, the computer system automatically retrieves rules-based information that has been stored during the process of creating a Knowledge Map, and generates a set of rules for each option or module, as illustrated in step 30 (FIG. 1). FIG. 18A illustrates in further detail a portion of the step 30 of retrieving rules-based information and generating rules in a form that can be used as input to a rules-based program. FIG. 18A illustrates a process 1802 of retrieving information pertaining to one module within the Knowledge Map and the corresponding generation of a rule pertaining to the module. At step 1804, the mechanism of the invention initializes a rule to Null. As discussed in further detail below, the process 1802 of generating a rule corresponding to a module operates by successively appending elements to the rule.

At step 1806, the next module of the Knowledge Map is retrieved. The first time the process 1802 is performed for a Knowledge Map, the module retrieved at step 1806 is the first module. The retrieved module is referred to herein as the "current" module. At step 1808, an option-module relationship connected to the current module is retrieved.

At step 1810, a test is made to determine whether the option-module relationship retrieved at step 1808 has a logical modifier. If the relationship has a logical modifier, as represented by a conjunction box, flow proceeds to step 1812, where the mechanism of the invention processes the logical option-module relationship represented by the conjunction box. The processing of step 1812 is illustrated in FIG. 18B, and explained below.

If, at step 1810, the retrieved option-module relationship does not have a logical modifier, flow proceeds to step 1814. At step 1814, the mechanism of the invention processes the option-module relationship without a logical modifier. The step 1814 of processing an option-module relationship is illustrated in FIG. 18C, and explained below.

The step 1812 of processing a logical option-module relationship and the step 1814 of processing an option-module relationship produce one or more rule elements that are appended to the current rule. Following step 1812 or step 1814, flow control proceeds to step 1816, to determine whether another unprocessed option-module relationship is connected to the current module. If another relationship exists, at step 1818, the text string "AND" is appended to the current rule. Flow then returns to step 1806, to retrieve the next option-module relationship connected to the current module, and process it as discussed above. At step 1816, if no more option-module relationships are connected to the current module, the rule is complete for the current module. The process 1802 of creating a rule corresponding to a module is performed for each module in the Knowledge Map, resulting in a complete set of rules.

Figure 18B:
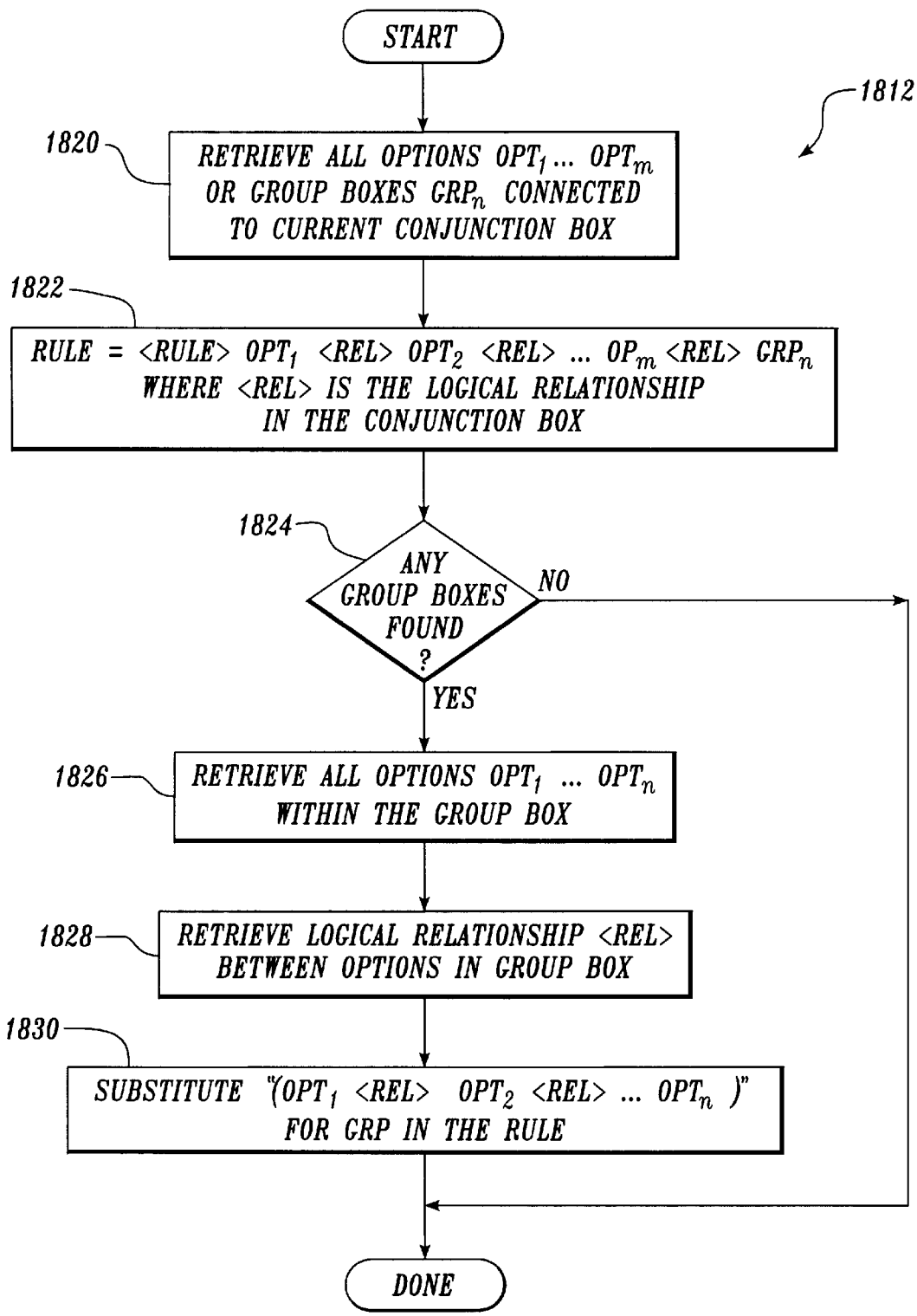
Figure 18C:
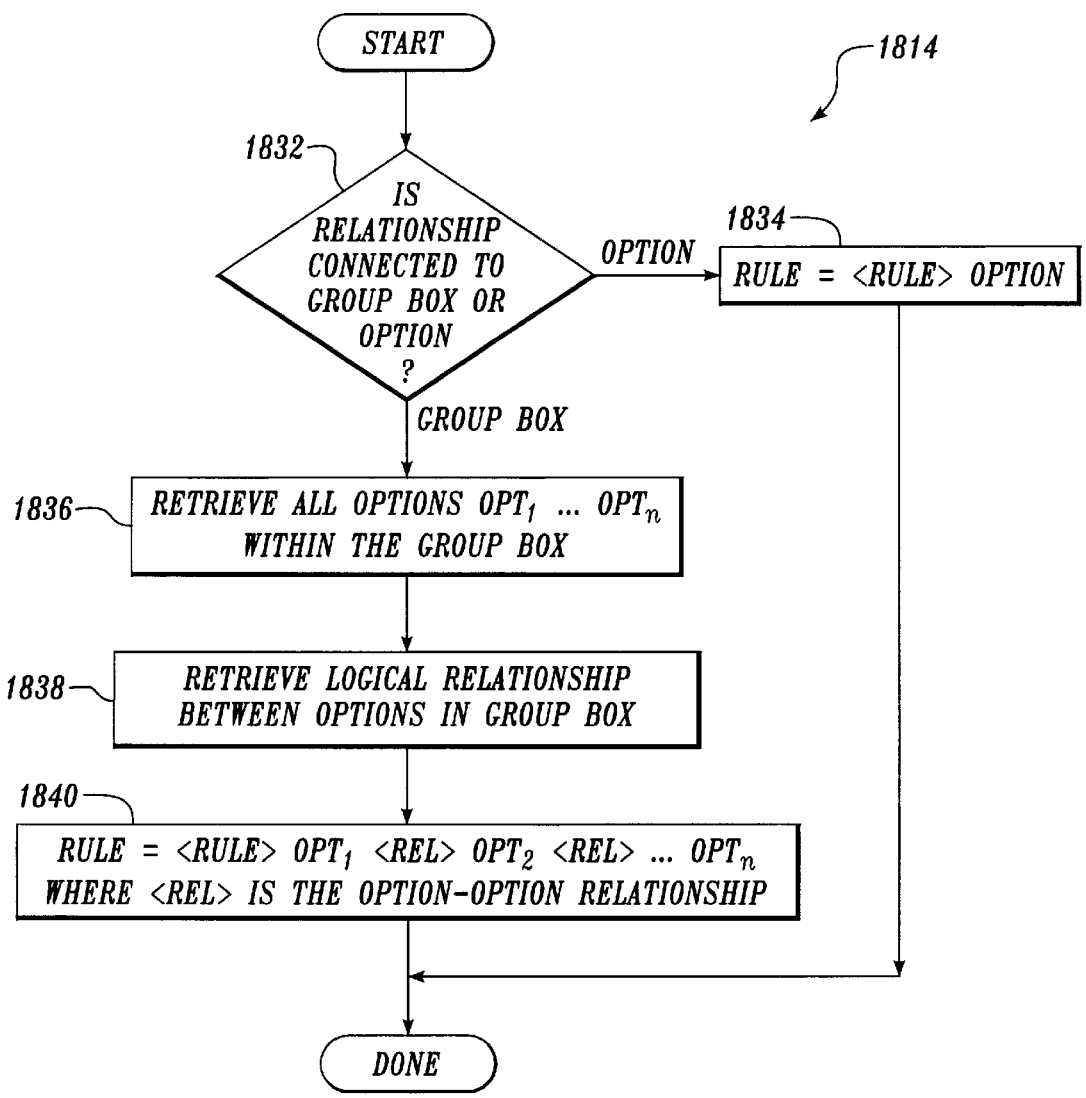

FIG. 18B illustrates in further detail the step 1812 of processing a logical option-module relationship connected to the current module, during rule creation. At step 1820, the mechanism of the invention retrieves all options or group boxes that are connected to the conjunction box modifying the option-module relationship. At step 1822, rule elements are appended to the current rule as follows:

Rule=<Rule>OPT$_1$<rel>OPT$_2$<rel> . . . OPT$_m$<rel>GRP$_n$

Where <rel> is the logical relationship specified in the conjunction box, and GRP$_m$ is a group box connected to the conjunction box. Zero, one, or more group boxes can be connected to the conjunction box. To simplify FIG. 18B and this discussion, the process of creating a rule is explained with reference to only one group box. As should be apparent to one skilled in the art of computer programming, and others, this process can easily be extended to allow for a plurality of group boxes.

For example, in FIG. 7D, when the 24-ply tires module 776 is the current module retrieved at step 1806, the option-module relationship modified by the "OR" conjunction box 779 is retrieved at step 1808. Since the retrieved relationship includes a logical modifier, the process flow proceeds to step 1812.

Returning to FIG. 18B, at step 1820, the "minor model" option 778 and the "maximum landing weights" group box 788 are retrieved. At step 1822, the current rule is modified to:

0110-000016 OR <Group Box 788>

Where "0110-000016" is the option identifier for the "minor model" option 778.

Continuing with the explanation of FIG. 18B, at step 1824, a test is made to determine whether any group boxes were found at step 1820. If a group box is found, flow proceeds to step 1826, where all options within the group box are retrieved. At step 1828, the logical relationship between options within the group box is retrieved. Preferably, the method of the invention includes a restriction that all options within a group box must be connected by the same type of logical relationship. If different types of logical relationships are desired, this can be handled by nesting group boxes, such that all logical relationships within any one group box are of the same type. Alternatively, different logical relationships can be combined within a single group box.

At step 1830, the rule segment, "(OPT$_1$ <rel> OPT$_2$ <rel> . . . OPT$_n$)" is substituted for "GRP" in the rule formed at step 1822. Process flow then proceeds to step 1816 in FIG. 18A. If, at step 1824, there are no group boxes found, flow proceeds to step 1816 in FIG. 18A.

Returning to the above-described example referring to FIG. 7D, at step 1826, the "198,000 lbs." option 782 and the "increase maximum landing weight" option 784 are retrieved. At step 1828, the disjunctive relationship 486 is retrieved. At step 1830, the string "(0315-000025 OR 0315-000026)" is substituted for <Group Box 788> in the current rule, resulting in the rule:

0110-000016 OR (0315-000025 OR 0315-000026)

where "0315-000025" is the option identifier for the "198,000 lbs." option 782, and the "0315-000026" is the option identifier for the "increase maximum landing weight" option 784.

The process flow then continues at step 1816, where it is determined that no additional relationships are connected to the current module. The rule for the "24-ply tires" module 776 is complete.

FIG. 18C illustrates in further detail the step 1814 of processing a non-logical option-module relationship. At step 1832, a test is made to determine whether the option-module relationship retrieved at step 1808 is connected to a group box or a single option. If the option-module relationship is connected to a single option, flow control proceeds to step 1834. At step 1834, the option connected to the option-module relationship is appended to the current rule. After step 1828, the processing of the current option-module relationship is completed.

Figure 19:
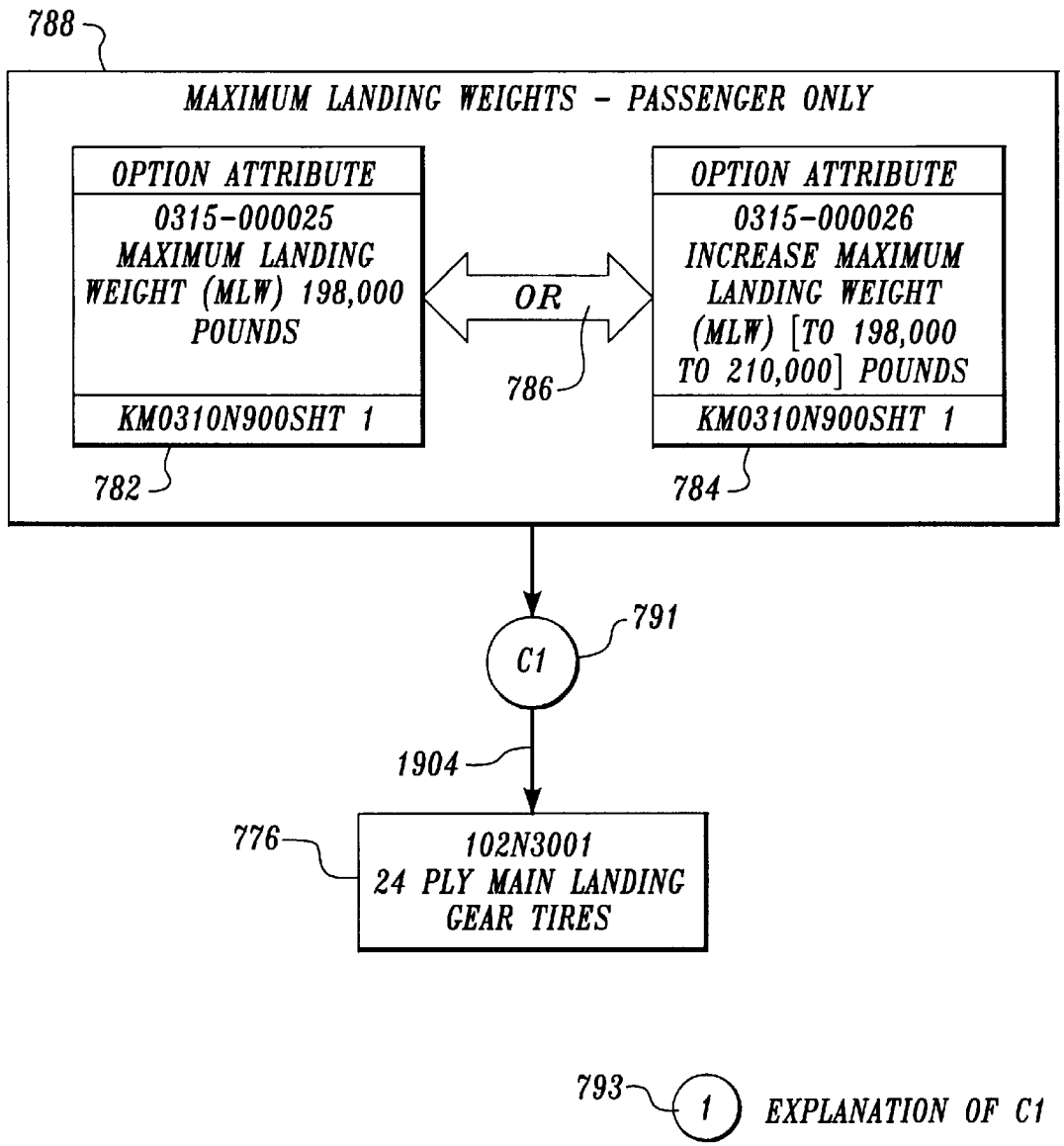
FIG. 19 illustrates an exemplary Knowledge Map.

If, at step 1832, the retrieved option-module relationship is connected to a group box, flow proceeds to step 1836. At step 1836, the mechanism of the invention retrieves all options within the connected group box. For example, FIG. 19 illustrates a portion of the Knowledge Map depicted in FIG. 7D, revised to exclude the "minor model" option 778, and therefore excluding the OR conjunction box 779. As depicted in FIG. 19, an option-module relationship 1904 connects the "24-ply tires" module 776 with the "maximum landing weights" group box 788. The group box 788 includes the "maximum landing weight" option 782 and the "increase maximum landing weight" option 784, which are connected by a disjunctive relationship 786. At step 1836 (FIG. 18C), the "maximum landing weight" option 782 and the "increase maximum landing weight" option 784 are retrieved.

At step 1838, the mechanism of the invention retrieves the logical relationship that exists between the options in the group box. As depicted in FIG. 19, the logical relationship is a disjunctive (OR) relationship 786. At step 1840, the rule elements OPT$_1$ <rel> OPT$_2$ <rel> . . . OPT$_n$ where <rel> is the logical relationship retrieved at step 1838, are appended to the current rule. As depicted in FIG. 19, the current rule becomes:

0315-000025 OR 0315-000026

The group box depicted in FIG. 19 contains two options. It is also possible that a group box connected to a relationship, and processed according to step 1814, contains one or more nested group boxes. It should be apparent to one skilled in the art of computer programming, and others, that the step 1814 of processing an option-module relationship, as illustrated in FIG. 18C, can be modified to recursively retrieve all nested group boxes and options, and create a rule, in accordance with the process of the invention as described herein.

FIG. 20 illustrates a portion of the step 34 (FIG. 1) of retrieving object-based information and generating object-based data for use in creating an object-based program. FIG. 20 illustrates the portion of the step 34 pertaining to the production of object-based data corresponding to one group box and its nested group boxes on a Knowledge Map. At step 2004, a target group box is retrieved from the computer storage representing the Knowledge Map data. For example, in FIG. 7B, the group box 762 representing a general door arrangement is retrieved at step 2004. At step 2006, all constraint relationships associated with the retrieved group box 762 are retrieved. As depicted in FIG. 7B, at step 2006, the contingent relationship 760 is retrieved.

At step 2008, the method retrieves the first object within the current group box 762. As depicted in FIG. 7B, the "Type I,I,III,III,I door arrangement" option 763 is the first object retrieved. At step 2010, the method retrieves all class attributes of the current object 763. At step 2012, the method retrieves all attributes specific to the current object 763.

At step 2014, a test is made to determine whether any additional objects exist within the current group box 762. If an additional object exists, flow proceeds to step 2016, where the method retrieves the next object within the current group box 762. As depicted in FIG. 7B, the next object is the "Type I,I,I,I door arrangement" option 764. Flow then proceeds back to step 2010, to retrieve class attributes of the new current object 764.

At step 2012, object-specific attributes for the new current option 764 are retrieved. At step 2014, if no more objects are within the current group box, as depicted in FIG. 7B, flow proceeds to step 2018. At step 2018, a test is made to determine whether any subclasses exist within the current group box. If any subclasses exist within the group box, at step 2020 the method retrieves the first subclass within the current group box 762. At step 2022, the method recursively repeats the group box analysis that begins at step 2004, as described above. At step 2024, a test is made to determine whether any additional subclasses exist within the current group box 762. If any additional group boxes exist, flow returns back to step 2020, to retrieve the next subclass.

If, at step 2024, no more subclasses exist within the current group box 762, flow proceeds to step 2026, where the method prints the retrieved class-based information. The class based information corresponds to the Knowledge Map, such that each group box represents a class of options, and each nested group box represents a subclass of the class corresponding to the group box that surrounds it. For example, in FIG. 4A, the "PW engine options" group box 426, the "RR engine options" group box 436, and the "high altitude" group box 446 all represent subclasses of the option class corresponding to the "engine options" group box 440.

Returning now to FIG. 1, after automatically generating object-based data from the retrieved object-based information, a computer programmer skilled in the art of object-oriented programming creates an object-based program, at step 36. At step 38, the object-based program is executed to validate a set of product options selected by a customer. The object-based program also automatically configures a final product, determining the modules required based upon the set of product options selected.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of structuring product information used in a determination of a product configuration, using a computer system comprising a processor, memory, an input device, and a computer display device having a display area for displaying graphical symbols, the method comprising:
   (a) displaying a palette within said display area, said palette comprising a representation of a plurality of graphical product objects and at least one graphical logical relationship object, said at least one logical relationship object representing a disjunctive relationship between product options, said plurality of graphical product objects including:
      (i) at least one graphical option object, wherein said graphical option object represents a product option and includes at least one attribute identifying said product option; and
      (ii) at least one graphical module object, wherein said graphical module object represents a product module and includes at least one attribute identifying said product module;
   (b) receiving a plurality of selection inputs from said computer input device, including a first selection input representing a first graphical product object, a second selection input representing a second graphical product object, and a third selection input representing one of said graphical logical relationship objects;
   (c) receiving a plurality of coordinate inputs from said computer input device, each coordinate input corresponding to one of said selection inputs and representing a position in said display area of said computer display device;
   (d) graphically representing said first graphical product object, said second graphical product object, and said graphical logical relationship object, each graphical product object being represented at a position corresponding to one of said coordinate inputs;
   (e) receiving an input selection of an identifier corresponding to said first graphical product object, said identifier corresponding to a first entry in a database;
   (f) receiving an input selection of an identifier corresponding to said second graphical product object, said identifier corresponding to a second entry in said database;
   (g) creating a link between said second graphical product object and said graphical logical relationship object; and
   (h) storing information pertaining to said first graphical product object, said second graphical product object, and said graphical logical relationship object in said database.

2. The method of claim 1, wherein said palette further comprises a graphical logical relationship object representing a conjunctive relationship between product options.

3. The method of claim 2, wherein said palette further comprises a graphical contingent relationship object representing a contingent relationship between said first graphical product object and said second graphical product object.

4. The method of claim 3, wherein said palette further comprises a graphical group box object representing a grouping of a plurality of product option objects.

5. The method of claim 4, further comprising:
   receiving a selection input representing a graphical group box object;
   receiving a coordinate input representing a position in said display area for displaying of said graphical group box; and
   graphically representing said graphical group box, said graphical representation indicative of a grouping of said first graphical product object and said second graphical product object.

6. The method of claim 2, wherein said palette further comprises a graphical constraint object representing a constraint relationship between said first at least one graphical product object and said second at least one graphical product object.

7. The method of claim 1, wherein said first graphical product object is a graphical option object, and said second graphical product object is a graphical option object.

8. The method of claim 7, wherein said first graphical product object is a graphical hard called-out option object, and said second graphical product object is a graphical reference option object, and wherein said first entry in said database is the same as said second entry in said database.

9. The method of claim 1, further comprising:
   (a) verifying that said graphical logical relationship object has associated links with at least two of said plurality of graphical product objects.

10. The method of claim 1, further comprising:
   (a) verifying that said graphical logical relationship object has associated links with exactly two of said plurality of graphical product objects.

11. A method of structuring product information used in a determination of a product configuration, using a computer system comprising a processor, memory, an input device, and a computer display device having a display area for displaying graphical symbols, the method comprising:
   (a) displaying a palette within said display area, said palette comprising a representation of a plurality of graphical product objects and at least one graphical logical relationship object, said plurality of graphical product objects comprising:
      (i) at least one graphical option object, wherein said graphical option object represents a product option and includes at least one attribute identifying said product option wherein each of said graphical product option objects comprises:
         (aa) an option type field including information representative of the type of option;
         (bb) an option identifier field containing an identifier corresponding to a product option;
         (cc) a description field containing information indicative of a description of said graphical product option object; and (dd) wherein said method further comprises preventing an operator from deleting said fields included in said product option; and (ii) at least one graphical module object, wherein said graphical module object represents a product module and includes at least one attribute identifying said product module;

(b) receiving a plurality of selection inputs from said computer input device, including a first selection input representing a first graphical product object, a second selection input representing a second graphical product object, and a third selection input representing one of said graphical logical relationship objects, wherein said graphical logical relationship represents a disjunctive relationship between product options;

(c) receiving a plurality of coordinate inputs from said computer input device, each coordinate input corresponding to one of said selection inputs and representing a position in said display area of said computer display device;

(d) graphically representing said first graphical product object, said second graphical product object, and said graphical logical relationship object, each graphical product object being represented at a position corresponding to one of said coordinate inputs;

(e) receiving an input selection of an identifier corresponding to said first graphical product object, said identifier corresponding to a first entry in a database;

(f) receiving an input selection of an identifier corresponding to said second graphical product object, said identifier corresponding to a second entry in said database;

(g) creating a link between said second graphical product object and said graphical logical relationship object; and (h) storing information pertaining to said first graphical product object, said second graphical product object, and said graphical logical relationship object in said database.

12. A method of structuring product information used in a determination of a product configuration, using a computer system comprising a processor, memory, an input device, and a computer display device having a display area for displaying graphical symbols, the method comprising:

(a) displaying a palette within said display area, said palette comprising a representation of a plurality of graphical product objects and at least one graphical logical relationship object, said plurality of graphical product objects comprising:

(i) at least one graphical option object, wherein said graphical option object represents a product option and includes at least one attribute identifying said product option; and (ii) at least one graphical module object, wherein said graphical module object represents a product module and includes at least one attribute identifying said product module;

(b) receiving a plurality of selection inputs from said computer input device, including a first selection input representing a first graphical product object, a second selection input representing a second graphical product object, and a third selection input representing one of said graphical logical relationship objects;

(c) receiving a plurality of coordinate inputs from said computer input device, each coordinate input corresponding to one of said selection inputs and representing a position in said display area of said computer display device;

(d) graphically representing said first graphical product object, said second graphical product object, and said graphical logical relationship object, each graphical product object being represented at a position corresponding to one of said coordinate inputs;

(e) receiving an input selection of an identifier corresponding to said first graphical product object, said identifier corresponding to a first entry in a database;

(f) receiving an input selection of an identifier corresponding to said second graphical product object, said identifier corresponding to a second entry in said database;

(g) creating a link between said second graphical product object and said graphical logical relationship object;

(h) storing information pertaining to said first graphical product object, said second graphical product object, and said graphical logical relationship object in said database;

(i) receiving a drawing number;

(j) verifying that said drawing number is valid; and (k) displaying a message if said drawing number is not valid.

13. The method of claim 1, further comprising:

retrieving the stored information pertaining to the graphical product objects and generating a set of rules for use by a rules-based computer program to produce product configuration data.

14. A method of creating a Knowledge Map containing graphical objects that represent product information used in a determination of a product configuration, the method comprising:

(a) receiving a selection of two graphical product objects, including a first graphical product object and a second graphical product object, and displaying said graphical product objects;

(b) receiving a selection of a graphical relation object representing a relationship between said graphical product objects, and displaying said graphical relation object;

(c) storing, in a database, data specifying the position of said graphical product objects and said graphical relation object;

(d) receiving, for each graphical product object, a selection of an associated option identifier, said option identifier corresponding to a predetermined list of option identifiers stored in said database;

(e) verifying that said option identifier associated with said first graphical product object is different from said option identifier associated with said second graphical product object; and (f) in response to receiving an input to modify the Knowledge Map, repeating (a)–(e).

15. The method of claim 14, wherein said first graphical product object is a graphical option object, and said second graphical product object is a graphical module object.

16. A computer-based method of configuring a product on a computer system having a processor, a memory, an input device, and a display area; the method comprising:

(a) receiving at least two input selections indicative of a graphical product object representative of product configuration information;

(b) receiving input representative of a disjunctive relationship between two of the graphical product objects indicated by the object input;

(c) graphically representing the graphical product objects and the relationship between the graphical product objects within the display area;

(d) storing information pertaining to the selected graphical product objects and the relationship between the graphical product objects; and (e) generating a set of rules for use by a rules-based computer program to produce product configuration data, the generation of rules based on the stored information.

17. The method of claim 16, wherein at least one of the graphical product objects is a graphical option object representing a product option, and at least one graphical product object is a graphical module object representative of a product module, and wherein the generation of the rule includes:

identifying at least one graphical option object having associated information specifying that a customer's selection of the product option corresponding to the graphical option object requires an inclusion of the product module corresponding to the graphical module object.

18. The method of claim 16, wherein the generation of the set of rules comprises:

(a) determining whether a first graphical option object and a second graphical option object have a conjunctive relationship with a graphical module object, the conjunctive relationship representing the information that a customer's selection of the first graphical option object and the second graphical option object requires the inclusion of the module in the product; and (b) in response to the determination, selectively generating a rule specifying the conjunctive relationship between the first graphical option object, the second graphical option object, and the graphical module object.

19. The method of claim 16, further comprising:

(a) receiving input representative of a customer's selection of at least one product option having a corresponding graphical product option object; and (b) determining whether the customer's selection is logically consistent with the stored information.

20. A computer-based method of configuring a product on a computer system having a processor, a memory, an input device, and a display area; the method comprising:

(a) receiving at least two input selections indicative of a graphical product object representative of product configuration information;

(b) receiving input representative of a disjunctive relationship between two of the graphical product objects indicated by the object input;

(c) graphically representing the graphical product objects and the relationship between the graphical product objects within the display area;

(d) storing information pertaining to the selected graphical product objects and the relationship between the graphical product objects; (e) generating data for use in creating an object-based computer program, the generation of data based on the stored information; and (f) creating an object-based computer program based on the generated data, the object-based program operative for producing product configuration data.

21. The method of claim 20, wherein at least one of the graphical product objects is a graphical option object representing a product option, and at least one graphical product object is a graphical module object representative of a product module, and wherein the generation of the rule includes:

identifying at least one graphical option object having associated information specifying that a customer's selection of the product option corresponding to the graphical option object requires an inclusion of the product module corresponding to the graphical module object.

* * * * *

UNITED STATES PATENT AND TRADEMARK OFFICE
CERTIFICATE OF CORRECTION

PATENT NO. : 6,035,305
DATED : March 7, 2000
INVENTOR(S) : T.S. Strevey et al.

It is certified that error appears in the above-identified patent and that said Letters Patent is hereby corrected as shown below:

| COLUMN | LINE | ERROR |
|---|---|---|
| 30 (Claim 20, line 15) | 22 | the phrase beginning "(e)…" should start a new paragraph |

Signed and Sealed this

Twenty-sixth Day of June, 2001

*Attest:*

*Attesting Officer*

NICHOLAS P. GODICI
*Acting Director of the United States Patent and Trademark Office*